(12) United States Patent
Colls et al.

(10) Patent No.: US 9,925,694 B2
(45) Date of Patent: Mar. 27, 2018

(54) CONTINUOUS BAGGING PROCESSES AND SYSTEMS

(71) Applicant: GALA INDUSTRIES, INC., Eagle Rock, VA (US)

(72) Inventors: Keith "Kipp" Colls, Roanoke, VA (US); Duane Boothe, Clifton Forge, VA (US)

(73) Assignee: GALA INDUSTRIES, INC., Eagle Rock, VA (US)

( * ) Notice: Subject to any disclaimer, the term of this patent is extended or adjusted under 35 U.S.C. 154(b) by 552 days.

(21) Appl. No.: 14/601,740

(22) Filed: Jan. 21, 2015

(65) Prior Publication Data

US 2015/0135645 A1    May 21, 2015

Related U.S. Application Data

(63) Continuation-in-part of application No. 13/202,909, filed as application No. PCT/US2010/025255 on Feb. 24, 2010, now Pat. No. 8,955,294.

(Continued)

(51) Int. Cl.
*B29B 9/06*    (2006.01)
*B29B 9/16*    (2006.01)
(Continued)

(52) U.S. Cl.
CPC ............... *B29B 9/16* (2013.01); *B29B 9/065* (2013.01); *B65B 9/22* (2013.01); *B65B 39/04* (2013.01);
(Continued)

(58) Field of Classification Search
CPC .. B65B 9/15; B65B 9/20; B65B 63/02; B65B 63/08; B65B 65/06; B65B 2039/009;
(Continued)

(56) References Cited

U.S. PATENT DOCUMENTS 2,113,636 A    4/1938    Vogt
2,618,814 A    11/1952   Paton et al.
(Continued)

FOREIGN PATENT DOCUMENTS

CN    1063084 A    7/1992
CN    1528844 A    9/2004
(Continued)

OTHER PUBLICATIONS

Office Action in related Japanese Application No. 2011-551314 dated Nov. 5, 2014, 2 pages.
(Continued)

*Primary Examiner* — Stephen F Gerrity
(74) *Attorney, Agent, or Firm* — Troutman Sanders LLP; Ryan A. Schneider; John A. Morrissett

(57) ABSTRACT

Methods and systems for continuously bagging pellets formed from a tacky and/or polymer containing formulation include improved drying systems and techniques. The methods and systems may include directing a flow of air to help contain moisture within a dryer, transport pellets out of the dryer, and/or dry pellets as they move away from the dryer. The methods and systems may include conditioning (e.g., drying, coating, classifying) the pellets using a conditioning unit prior to bagging the pellets.

15 Claims, 14 Drawing Sheets

Related U.S. Application Data

(60) Provisional application No. 61/219,164, filed on Jun. 22, 2009, provisional application No. 61/155,045, filed on Feb. 24, 2009.

(51) Int. Cl.

| | | |
|---|---|---|
| B65B 39/00 | (2006.01) | |
| F26B 5/08 | (2006.01) | |
| F26B 17/22 | (2006.01) | |
| F26B 17/24 | (2006.01) | |
| B65B 39/04 | (2006.01) | |
| F26B 11/16 | (2006.01) | |
| B65B 9/22 | (2006.01) | |
| B65B 57/00 | (2006.01) | |
| B65B 61/02 | (2006.01) | |
| B65B 1/28 | (2006.01) | |

(52) U.S. Cl.
CPC .............. *F26B 5/08* (2013.01); *F26B 11/16* (2013.01); *F26B 17/22* (2013.01); *F26B 17/24* (2013.01); *B29B 2009/163* (2013.01); *B65B 1/28* (2013.01); *B65B 57/00* (2013.01); *B65B 61/02* (2013.01); *B65B 2039/009* (2013.01); *F26B 2200/08* (2013.01)

(58) Field of Classification Search
CPC .. B65B 1/16; B65B 1/28; B65B 39/04; B29B 9/065; B29B 9/16; B29B 13/045; F26B 5/08; F26B 17/00; F26B 17/22; F26B 17/24
USPC ......... 53/428, 434, 438, 440, 451, 459, 469, 53/111 R, 512, 529, 127, 551, 567, 575, 53/576, 168, 202, 502, 503, 385.1
See application file for complete search history.

(56) References Cited

U.S. PATENT DOCUMENTS

| | | | |
|---|---|---|---|
| 2,727,809 A | | 12/1955 | Lust |
| 2,880,519 A | * | 4/1959 | Pollock .................... F26B 5/08 |
| | | | 23/314 |
| 2,927,763 A | | 3/1960 | Overman |
| 3,040,490 A | | 6/1962 | Virta |
| 3,202,084 A | | 8/1965 | Hale et al. |
| 3,419,414 A | | 12/1968 | Marks |
| 3,436,243 A | | 4/1969 | Kruger |
| 3,458,045 A | | 7/1969 | Dudley |
| 3,521,426 A | | 7/1970 | Evins |
| 3,581,407 A | * | 6/1971 | Ward et al. ............. F26B 17/22 |
| | | | 34/166 |
| 3,707,172 A | | 12/1972 | Obara |
| 3,892,834 A | | 7/1975 | Pritchard |
| 3,989,853 A | | 11/1976 | Forkner |
| 4,117,645 A | | 10/1978 | Phillips |
| 4,123,207 A | | 10/1978 | Dudley |
| 4,218,323 A | | 8/1980 | McCracken |
| 4,251,198 A | | 2/1981 | Altenburg |
| 4,447,325 A | | 5/1984 | Pauley |
| 4,500,271 A | | 2/1985 | Smith |
| 4,565,015 A | | 1/1986 | Hundley, III |
| 4,621,966 A | | 11/1986 | Luperti et al. |
| 4,686,937 A | | 8/1987 | Rosenfeld |
| 4,688,371 A | | 8/1987 | Hecht |
| 4,728,276 A | | 3/1988 | Pauley et al. |
| 4,738,287 A | | 4/1988 | Klinkel |
| 4,872,493 A | | 10/1989 | Everman |
| 4,888,990 A | | 12/1989 | Bryan et al. |
| 4,896,435 A | | 1/1990 | Spangler, Jr. |
| 4,964,259 A | | 10/1990 | Ylvisaker et al. |
| 5,041,251 A | | 8/1991 | McCoskey et al. |
| 5,059,103 A | | 10/1991 | Bruckmann et al. |
| 5,077,958 A | | 1/1992 | Peppard et al. |
| 5,265,347 A | | 11/1993 | Woodson et al. |
| 5,403,176 A | | 4/1995 | Bruckmann et al. |
| 5,531,845 A | | 7/1996 | Flanigan et al. |
| 5,624,688 A | | 4/1997 | Adams et al. |
| 5,626,004 A | | 5/1997 | Gates et al. |
| 5,638,606 A | | 6/1997 | Bryan et al. |
| 5,638,660 A | | 7/1997 | Kuo |
| 5,653,872 A | | 8/1997 | Cohan |
| 5,869,555 A | | 2/1999 | Simmons et al. |
| RE36,177 E | | 4/1999 | Rouyer et al. |
| 5,895,617 A | | 4/1999 | Mizuguchi et al. |
| 5,927,049 A | | 7/1999 | Simard |
| 5,942,569 A | | 8/1999 | Simmons et al. |
| 6,116,001 A | | 9/2000 | Kammler et al. |
| 6,120,899 A | | 9/2000 | Cameron et al. |
| 6,138,375 A | | 10/2000 | Humphries, II et al. |
| 6,237,244 B1 | | 5/2001 | Bryan et al. |
| 6,238,732 B1 | | 5/2001 | Cameron et al. |
| 6,332,765 B1 | | 12/2001 | Spelleken |
| 6,551,087 B1 | | 4/2003 | Martin |
| 6,623,829 B1 | | 9/2003 | Fuss et al. |
| 6,739,457 B2 | | 5/2004 | Humphries, II et al. |
| 6,793,473 B1 | | 9/2004 | Fridley |
| 6,807,748 B2 | | 10/2004 | Bryan et al. |
| 6,824,371 B2 | | 11/2004 | Smit |
| 6,925,741 B2 | | 8/2005 | Eloo et al. |
| 6,938,357 B2 | * | 9/2005 | Hauch ...................... B29B 9/16 |
| | | | 34/168 |
| 7,024,794 B1 | | 4/2006 | Mynes |
| 7,033,152 B2 | | 4/2006 | Eloo et al. |
| 7,171,762 B2 | | 2/2007 | Roberts et al. |
| 7,172,397 B2 | | 2/2007 | Fridley |
| 7,267,540 B2 | | 9/2007 | Fridley et al. |
| 7,318,719 B2 | | 1/2008 | Fridley |
| 7,402,034 B2 | | 7/2008 | Fridley |
| 8,863,931 B2 | * | 10/2014 | Benoit et al. .......... B65G 47/72 |
| | | | 193/14 |
| 8,955,294 B2 | * | 2/2015 | Free et al. ................ B29B 9/16 |
| | | | 53/111 R |
| 2002/0014019 A1 | | 2/2002 | Hultsch |
| 2004/0074800 A1 | | 4/2004 | Harwell et al. |
| 2004/0106723 A1 | | 6/2004 | Yang et al. |
| 2004/0209082 A1 | | 10/2004 | Lee et al. |
| 2005/0139523 A1 | * | 6/2005 | Palmer .................... F26B 17/24 |
| | | | 209/155 |
| 2005/0217754 A1 | | 10/2005 | Gill et al. |
| 2006/0093764 A1 | | 5/2006 | Mehta et al. |
| 2006/0130353 A1 | | 6/2006 | Eloo |
| 2007/0132134 A1 | | 6/2007 | Eloo |
| 2007/0284771 A1 | | 12/2007 | Boothe et al. |
| 2007/0294982 A1 | | 12/2007 | Knoke et al. |
| 2008/0071061 A1 | | 3/2008 | Bruckmann |
| 2009/0110833 A1 | | 4/2009 | Wright et al. |
| 2009/0203840 A1 | | 8/2009 | Martin et al. |
| 2009/0206507 A1 | * | 8/2009 | Martin et al. ........... B29B 9/065 |
| | | | 264/141 |
| 2010/0251561 A1 | * | 10/2010 | Holmes et al. ........... B29B 9/16 |
| | | | 34/318 |
| 2011/0172382 A1 | | 7/2011 | Yeh et al. |
| 2012/0000161 A1 | | 1/2012 | Free et al. |

FOREIGN PATENT DOCUMENTS

| | | | | |
|---|---|---|---|---|
| DE | 1953741 A1 | | 5/1971 | |
| DE | 2248046 A1 | | 4/1974 | |
| DE | 2819443 A1 | | 11/1979 | |
| DE | 3234065 A1 | | 4/1983 | |
| DE | 3138222 C1 | | 5/1983 | |
| DE | 3327289 A1 | | 2/1985 | |
| DE | 3640520 A1 | | 6/1988 | |
| DE | 4330078 A1 | | 3/1994 | |
| DE | 9320744 U1 | | 1/1995 | |
| DE | 19708988 A1 | | 10/1997 | |
| DE | 102004053929 A1 | * | 5/2006 | ............... B29B 9/16 |
| EP | 0051484 | | 5/1982 | |
| EP | 0051484 A1 | | 5/1982 | |
| EP | 1123480 A1 | | 10/1998 | |
| EP | 1033545 A1 | | 9/2000 | |

(56) References Cited

FOREIGN PATENT DOCUMENTS

| EP | 1602888 A2 | 12/2005 | | |
|---|---|---|---|---|
| EP | 1647788 A2 | 4/2006 | | |
| EP | 1650516 | 4/2006 | | |
| EP | 1650516 A2 | 4/2006 | | |
| EP | 1830963 A1 | 9/2007 | | |
| EP | 2008784 | 12/2008 | | |
| EP | 2008784 A1 | 12/2008 | | |
| EP | 2135023 A2 | 12/2009 | | |
| GB | 948851 A * | 2/1964 | ............ | F26B 17/22 |
| GB | 2280187 | 1/1995 | | |
| GB | 2280187 A | 1/1995 | | |
| JP | S50-155179 A | 12/1975 | | |
| JP | 52013995 A | 2/1977 | | |
| JP | S52-068581 A | 5/1977 | | |
| JP | 60-191940 U | 12/1985 | | |
| JP | S60-191940 A | 12/1985 | | |
| JP | S63-294326 A | 12/1988 | | |
| JP | 64026201 U1 | 2/1989 | | |
| JP | H01-288408 A | 11/1989 | | |
| JP | H04-294718 A | 10/1992 | | |
| JP | 05032232 A | 2/1993 | | |
| JP | H07-501029 A | 2/1995 | | |
| JP | 09207131 A | 8/1997 | | |
| JP | 10095015 A | 4/1998 | | |
| JP | 11029103 A | 2/1999 | | |
| JP | H11-115908 A | 4/1999 | | |
| JP | H11-348902 A | 12/1999 | | |
| JP | 2004-331095 A | 11/2004 | | |
| JP | 2005021824 A | 1/2005 | | |
| NL | 9100119 A * | 8/1992 | ............ | F26B 17/22 |
| WO | WO 8401307 A1 * | 4/1984 | ............ | F26B 5/08 |
| WO | 00-34129 A1 | 6/2000 | | |
| WO | 2006076331 | 7/2006 | | |
| WO | 2007064580 A2 | 6/2007 | | |
| WO | 2007103509 A2 | 9/2007 | | |
| WO | 2007123931 A1 | 11/2007 | | |
| WO | 2011082049 A1 | 7/2011 | | |

OTHER PUBLICATIONS

Office Action in related Mexican Application No. MX/a/2011/008929 dated May 28, 2014, 3 pages.
Office Action in related Japanese Application No. 2011-551314 dated Feb. 4, 2014, 2 pages.
Supplementary European Search Report for dated Dec. 3, 2013 for related European Patent Application No. EP10746776.3, 9 pages.
Notification of First Office Action dated Oct. 26, 2012 for related Chinese Application No. 2010800103366; 12 pgs.
PCT International Search Report dated Jan. 19, 2011 for related PCT Patent Application No. PCT/US2010/025255; 5pgs.
International Search Report from related PCT Patent Application No. PCT/US2016/014214, dated May 19, 2016, 4 pages.
Written Opinion of the International Search Authority from related PCT Patent Application No. PCT/US2016/014214, dated May 19, 2016, 10 pages.
Examination Report in related Malaysian Patent Application No. PI 2011003798, dated Mar. 16, 2015, 3 pages.

* cited by examiner

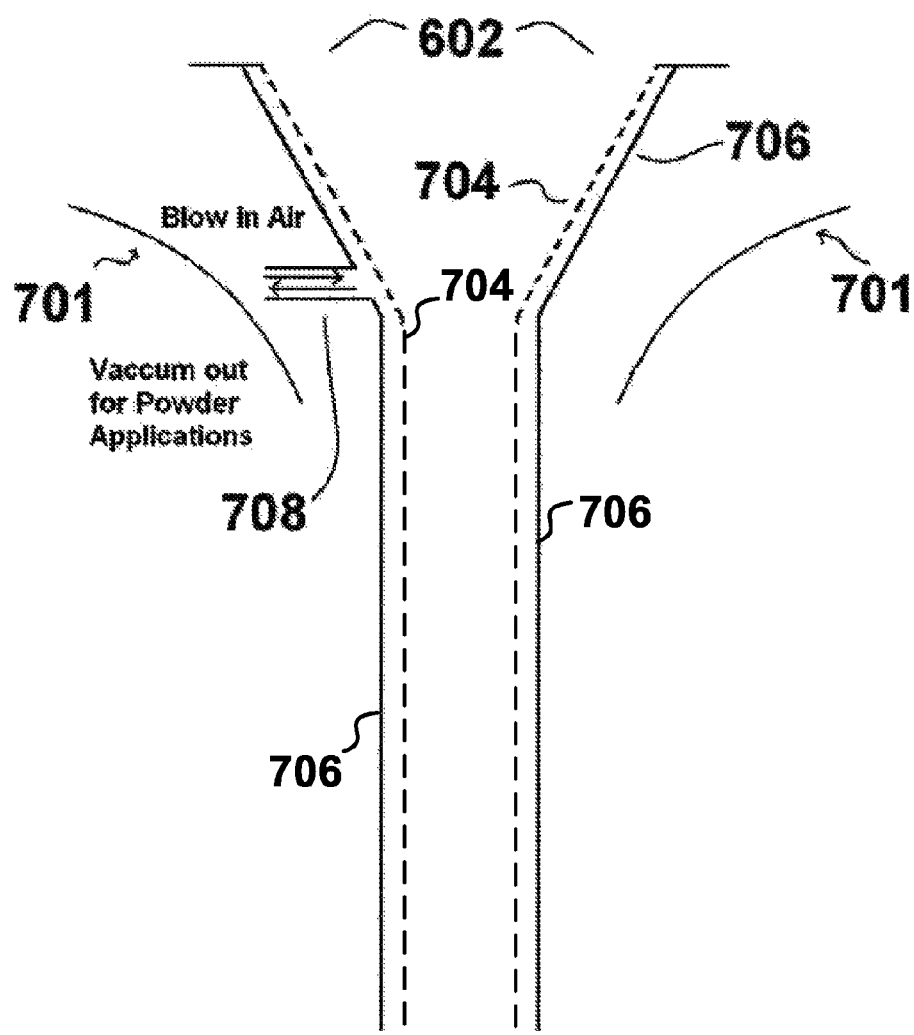

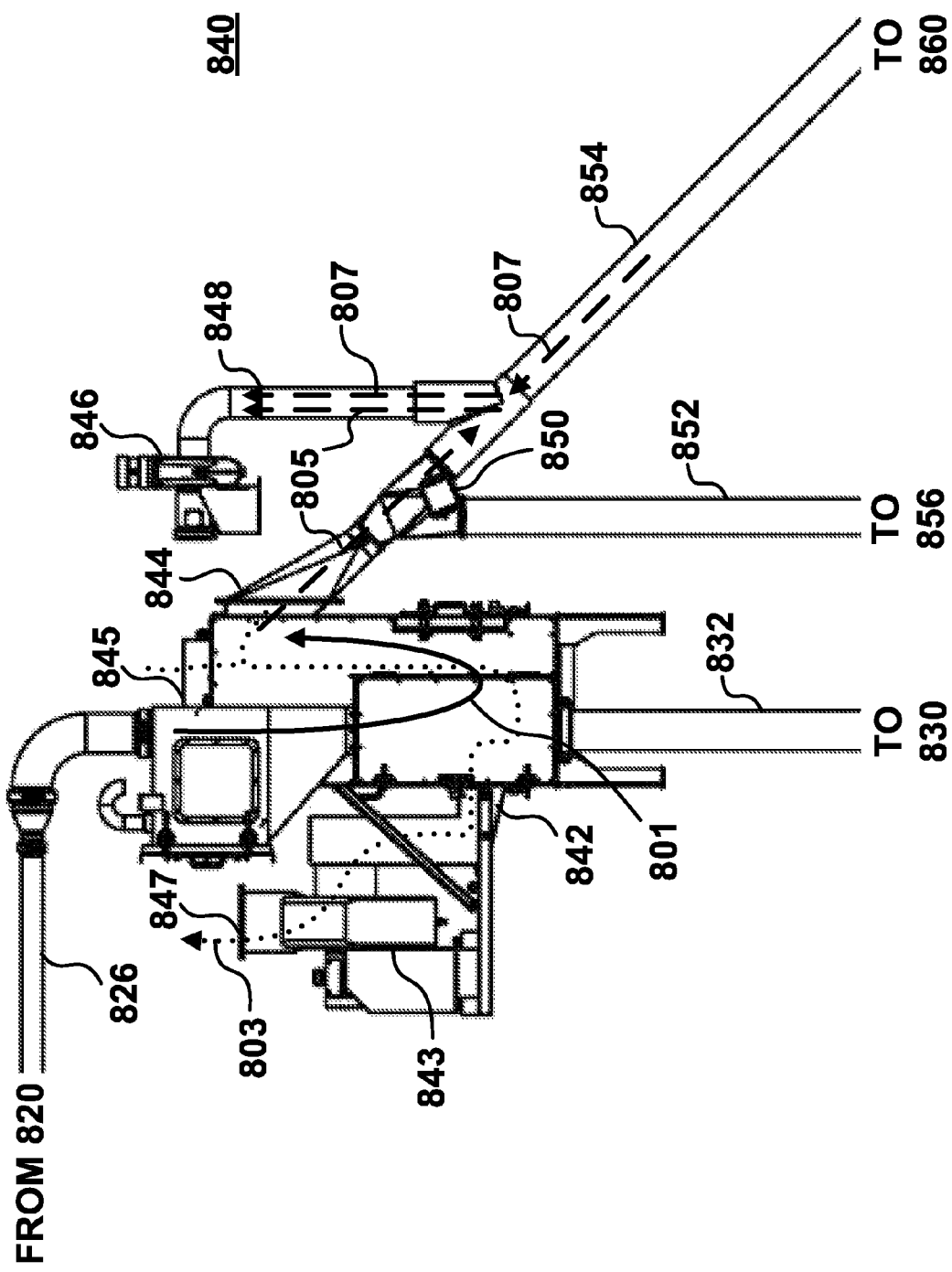

CONTINUOUS BAGGING PROCESSES AND SYSTEMS

CROSS-REFERENCE TO RELATED APPLICATION AND PRIORITY CLAIM

The present application is a continuation-in-part and claims the benefit, under 35 U.S.C. § 120, of U.S. patent application Ser. No. 13/202,909, filed Aug. 23, 2011, which claims the benefit of International Patent Application No. PCT/US2010/025255, filed Feb. 24, 2010, which claims the benefit of U.S. Provisional Patent Application No. 61/219,164, filed Jun. 22, 2009, and U.S. Provisional Patent Application No. 61/155,045, filed Feb. 24, 2009, all of which are hereby incorporated by reference in their entirety as if fully set forth below.

FIELD OF THE INVENTION

The presently disclosed subject matter generally relates to processes and systems for bagging pellets, particularly processes and systems of extruding, pelletizing, drying, and continuously bagging pellets.

BACKGROUND

The generally independent processes of, and equipment for use in, extrusion, pelletization, drying, and bagging of polymeric material are known and have been used in various applications. Over time, the demand for processes and equipment capable of efficiently extruding, pelletizing, drying, and bagging tacky polymers (e.g., hot melt adhesives and hot melt pressure sensitive adhesives) has increased. Yet, the prior art remains silent as to a process where such materials are extruded, pelletized, dried, and bagged continuously (i.e., where such material is pelletized and flows continuously throughout the process until it is bagged).

German Patent DE 22 48 046 discloses the confectioning and packaging of thermoplastic adhesives. According to the teachings of this patent, which are widely used, a hot melt adhesive is squeeze-cut into roughly pillow-shaped pieces, the pieces are subsequently cooled (and thus solidified), are then put into sacks, cartons, and like containers for packaging. To reduce the tendency of the individual pillows to stick or to adhere to each other, an anti-stick substance (e.g., a wax or a polymer) can be used to coat them, as taught in German Patent DE 33 27 289. Another method for packaging adhesive compositions includes wrapping or placing larger portions of the adhesive in a plastic film material, such as thick polyethylene.

These existing packaging techniques suffer from drawbacks. Specifically, the adhesive composition must be removed from the packaging material prior to use, thereby requires further handling of the material. In addition, the packaging material must be discarded after emptying, which leads to material waste and expenditures for disposal of the used packaging material.

German Patents DE 31 38 22 and DE 32 34 065 disclose coating the circumference of elongated hot-melt portions with a thin polyolefin film in order to prevent sticking problems when winding these string-like portions unto each other. The portions are subsequently cut to make cartridge of cartouche fillings, whereby the film stays on the circumference and is molten and applied together with the adhesive.

The above-mentioned references relate to the concept of preventing individual hot-melt portions or pieces from sticking by individually coating them with a polymeric film. Such processes would not be practical for mass-producing thermoplastic adhesive composition pillows, since they would be very expensive to implement on an industrial scale, the desired adhesive composition would be greatly diluted with the coating film material, and the squeeze-cutting step does not allow for a complete enclosure of the individual pillows by the film.

Therefore, a need arose for a method of packaging one or more pieces of adhesive compositions that would reduce the amount of handling of the adhesive. Such a method is disclosed in U.S. Pat. No. Re. 36,177. This reference discloses a packaging material that is capable of being melted with the adhesive composition without adversely affecting the properties of the adhesive composition. That is, the packaging composition is blendable in the melted adhesive, and does not result in a deteriorated adhesive once blended therein. U.S. Pat. No. Re. 36,177, however, remains silent as to any processing conditions that are necessary to continuously bag such pelletized compositions.

Other methods for packaging tacky polymers have been developed and are widely known to those skilled in the art. One such method requires that the material be poured into a container (e.g., a plastic bag or specially designed cardboard box) in a molten state. Regardless of whether the melt is poured into a bag or a box, it must be cooled. To cool the molten polymer, which has been poured into a compatible bag, the polymer is placed into a flowing "bath" of cooling liquid. Such baths can take up a considerable amount of space and require a significant amount of energy to operate.

To package molten polymer in a box, prior art methods entail pouring the molten material into a specially designed box, such as a cardboard box with coated interior walls. Such boxes can be costly, and may only be used once. This method of boxing the molten material is not practical for a variety of reasons, including the polymeric material is exposed to contaminants, the overall method is environmentally unfriendly, it is difficult to remove the polymeric material from the box, and there is a possibility of breaks and/or leaks in the boxes during handling. Adding to the cost and inefficiency of such processes is the manner in which the melt is cooled. By placing the filled boxes on rolling trays and cooling them in large refrigerators, manufacturers are able to cool the melt, but at the expense of high electricity costs. Special release paper and plastic molds may also be used to package the material, but the paper can be costly and, in some cases, may only be used once as it must be torn to obtain the material which it surrounds. By packaging the material in special release paper it must first be cooled by way of the inefficient refrigerator method described above. Additionally, polymeric materials that are packaged in plastic molds are also cooled in a related manner. In addition to bagging and packaging processes, the extrusion, pelletization, and drying of polymeric materials have been described elsewhere.

For example dryer equipment has been used by the assignee of the present application for many years as demonstrated in prior art disclosures including, for example, U.S. Pat. Nos. 3,458,045, 4,218,323, 4,447,325, 4,565,015, 4,896,435, 5,265,347, 5,638,606, 6,138,375, 6,237,244, 6,739,457, 6,807,748, 7,024,794, and 7,171,762; U.S. Patent Application Publication No. 2006/0130353; German Patents and Applications DE 19 53 741, DE 28 19 443, DE 43 30 078, DE 93 20 744, and DE 197 08 988; and European Patents EP 1 033 545, EP 1 123 480, EP 1 602 888, EP 1 647 788, EP 1 650 516, and EP 1 830 963.

Similarly, pelletizing equipment has been used by the assignee of the present application for many years as demonstrated in prior art disclosures including, for example, U.S. Pat. Nos. 4,123,207, 4,251,198, 4,500,271, 4,728,276, 4,888,990, 5,059,103, 5,624,688, 6,332,765, 6,551,087, 6,793,473, 6,925,741, 7,033,152, 7,172,397, 7,267,540, and 7,318,719. Similarly, die equipment and designs have been used by the assignee of the present application for many years as demonstrated in the prior art disclosures including, for example, U.S. Pat. Nos. 4,621,996, 5,403,176, 6,824, 371, and 7,402,034.

Similarly, other methods and apparatuses have been developed and used by the assignee of the present application for many years as demonstrated in prior art disclosures including, for example, U.S. Patent Application Publication Nos. 2007/132134, 2009/0110833, 2007/0284771, U.S. patent application Ser. No. 12/029,963, International Patent Application Publication Nos. WO 2007/064580 and WO 2007/103509, and EP Patent Application No. EP 012 352.6. All of the above referenced patents and applications are all owned by the assignee and are included herein by way of reference in their entirety.

While helpful in drying and bagging the pellets, existing systems may have some limitations. For instance, these systems may not sufficiently or efficiently defluidize or otherwise dry the pellets prior to bagging. Further, the methods and components used in existing systems may cause pellets to stick together or adhere to surfaces within the system, resulting in wasted product and/or damaged machinery.

Accordingly, there is a need for improved systems and methods to address the above mentioned deficiencies. Embodiments of the present disclosure are directed to these and other considerations.

SUMMARY

Briefly described, embodiments of the presently disclosed subject matter relate to improvements over existing individual processes and apparatuses, resulting in efficient continuous bagging processes and systems.

These continuous bagging processes and systems can be used on any type of polymer-containing formulation. These processes and systems can also be used on any type of tacky or sticky formulation. In particular, these processes and systems are beneficial for use with tacky or sticky polymer-containing formulations. As used herein, the terms "tacky" or "sticky", when referring to a formulation, encompasses those formulations that, when in solid form (e.g., pellet, particle, powder, or the like), are soft at ambient temperature and can at least partially adhere to other items in which the solid form comes into contact. A few illustrative examples of tacky or sticky formulations, whether polymeric or not, include adhesives such as hot melt adhesives (HMAs), pressure sensitive adhesives (PSAs), hot melt pressure sensitive adhesives (HMPSAs), and the like; sealants; bitumen or tarmac-containing formulations, including without limitation asphalt, and the like; natural or synthetic rubbers; and precursors to any of the foregoing compositions such as polyesters, polyamides, and the like.

Owing to the tackiness or stickiness of these meltable and processable tacky and/or polymer-containing formulations, it has been found that difficulties arise when extruding, pelletizing, drying, and bagging such formulations. One such difficulty has been found to exist immediately after the pellets exit a dryer, such as a centrifugal dryer from the pellet outlet. The exiting pellets are exhausted with such a high velocity that, when coupled with their tacky or sticky nature, they tend to stick to many items in which they come into contact. In existing systems, a major hang-up point for the pellets has been the one or more pellet diverter valves, which are used to direct the flow of the pellets between various areas of collection (e.g., a waste container, collection for packaging, or the like).

It is sometimes advantageous to direct a counter flow of air through the dryer, which may be a centrifugal dryer, against the flow of pellets to further dry the pellets by containing moisture within the dryer that would otherwise escape the pellet outlet of the dryer along with the pellets. That is, as a rotor drives the pellet slurry through the dryer and out of the pellet outlet, thereby defluidizing or otherwise drying the pellets, the counter flow of air may help prevent the moisture driven by the rotor along with the pellets from escaping the pellet outlet. If the moisture escapes the pellet outlet along with the pellets, the pellets may require additional drying prior to coating or packaging. While helpful in containing the moisture within the dryer, this counter air flow can present difficulties of its own. For instance, when the air flow rate is too high, it redirects the pellet flow from the pellet outlet back into the dryer or holds the pellets at the pellet outlet rather than allowing the pellets to exit the pellet outlet. Accordingly, the air flow rate may be limited to a level that allows pellets to exit the pellet outlet, and this limited air flow rate may not fully prevent the moisture from escaping the dryer along with the pellets. To more completely dry the pellets, in one embodiment, a blower may direct a drying flow of air against the flow of pellets from the pellet outlet of the dryer to packaging. In another embodiment, the blower may direct a transport flow of air to help remove the pellets from the pellet outlet, thereby allowing the flow rate of counter flow of air through the dryer to be increased. In yet another embodiment, one or more conditioning units (e.g., additional dryers or classifiers) may be used downstream of the centrifugal dryer to fully dry the pellets before packaging.

In the packaging of the tacky and/or polymer-containing materials (and, in this case, the bagging of such materials), it has always been desirable to regulate the amount of material being put into the package so as to meet a specification and minimize material waste. Existing bagging processes are "non-continuous" in that the tacky and/or polymeric material, after exiting the dewatering and/or drying phase, is either interrupted and/or stopped prior to bagging so that it may accumulate, for example, in a hopper, until the desired weight is obtained. Once the desired weight is obtained, the material is released and bagged. Such methods, while effective for some materials, are not for formulations that are highly tacky or sticky. If the above-described methods are used in conjunction with highly tacky or sticky formulations, the formulation may never become bagged because the pellets could stick together and form an agglomerate within the hopper, which would prevent further processing.

Accordingly, one aspect of the present disclosure includes providing a continuous process in which pellets flow freely from the time they are pelletized and exit a dryer until they are deposited in a bag for packaging.

Another aspect of the present disclosure includes providing a continuous process in which molten material is pelletized, cooled, at least partially solidified, and dried prior to being packaged in a compatible bag.

Another aspect of the present disclosure includes providing, downstream of the dryer, a drying flow of air at least partially opposite a directional flow of pellets to help dry the pellets.

Another aspect of the present disclosure includes providing a transport flow of air to pull pellets away from a pellet outlet of the dryer.

Yet another aspect of the disclosure includes providing a counter flow of air at least partially opposite a pellet flow path within the dryer to help defluidize or otherwise dry the pellets.

An additional aspect of the present disclosure includes balancing the counter flow of air, the transport flow of air, and a mechanical driving of the pellets through the dryer to allow pellets to flow through the dryer and exit the pellet outlet.

Still yet, another aspect of the present disclosure allows for providing the counter flow of air at a flow rate sufficient to overcome the mechanical driving of the pellets to prevent the pellets from exiting the pellet outlet. It is contemplated that directing the defluidized pellets towards the multi-port valve may include suctioning a transport flow of air at a flow rate sufficient to overcome the counter flow of air at the pellet outlet to pull the de-fluidized pellets away from the pellet outlet.

Another aspect of the present disclosure includes conditioning the pellets downstream of the dryer in a conditioning unit. In some embodiments, the conditioning unit may be configured to further dry the pellets. In other embodiments, the conditioning unit may be configured to apply a powder coating to the pellets.

According to some embodiments of the present disclosure, a method for continuously bagging tacky and/or polymer-containing pellets can include pelletizing a tacky and/or polymer-containing composition in a pelletizer. The method can also include defluidizing pellets of the tacky and/or polymer-containing composition in a dryer. After defluidizing the pellets, the method can include directing the pellets from a pellet outlet of the dryer towards a multi-port valve. Directing the pellets can include providing a drying flow of air at least partially opposite a directional flow of the pellets towards the multi-port valve. The method can further include continuously diverting a specific quantity of the pellets through one of a plurality of outlets of the multi-port valve. After diverting the pellets, the method can include continuously bagging the pellets using a bagging assembly located at one or more of the plurality of outlets of the multi-port valve.

In some embodiments, directing the defluidized pellets towards the multi-port valve can include providing a transport flow of air to pull the defluidized pellets away from the pellet outlet.

In some embodiments, providing the drying flow of air can include suctioning the drying flow of air via one or more blowers disposed between the pellet outlet and the multi-port valve. Further, providing the transport flow of air can include suctioning the transport flow of air via the one or more blowers.

Defluidizing the pellets, in some embodiments, can include directing the pellets through the dryer along a pellet flow path and providing, along at least a portion of the pellet flow path, a counter flow of air at least partially opposite the pellet flow path.

For example, in some embodiments, directing the defluidized pellets towards the multi-port valve can include suctioning a transport flow of air at a flow rate sufficient to overcome the counter flow of air at the pellet outlet and pull the defluidized pellets away from the pellet outlet. One or more blowers disposed between the pellet outlet and the multi-port valve may suction the transport flow of air. Directing the defluidized pellets towards the multi-port valve can also include suctioning, by the one or more blowers, the drying flow of air to dry the defluidized pellets.

In other embodiments, directing the pellets through the dryer can include mechanically driving the pellets through the dryer along at least a portion of the pellet flow path to overcome the counter flow of air. Mechanically driving the pellets can include mechanically driving the pellets through the dryer along the pellet flow path via a rotor. Providing the counter flow of air can include providing, at least at the pellet outlet, the counter flow of air at a flow rate sufficient to overcome the mechanical driving of the pellets to prevent the pellets from exiting the pellet outlet. It is contemplated that directing the defluidized pellets towards the multi-port valve may include suctioning a transport flow of air at a flow rate sufficient to overcome the counter flow of air at the pellet outlet to pull the de-fluidized pellets away from the pellet outlet.

In some embodiments, continuously diverting the specific quantity of pellets through one or more of the plurality of outlets of the multi-port valve can be based on a predetermined time interval that results in diverting the specific quantity of pellets.

The method for continuously bagging tacky and/or polymer-containing pellets can further include conditioning the defluidized pellets in a conditioning unit downstream of the dryer. In some embodiments, conditioning the defluidized pellets can include drying the defluidized pellets and/or applying a powder coating to the defluidized pellets. The method for continuously bagging a tacky and/or polymer-containing formulation can also include directing the pellets from the conditioning unit to the multi-port valve. In some embodiments, the conditioning unit can be a tumbler.

A system for continuously bagging tacky and/or polymer-containing pellets can include a pelletizer configured to pelletize a tacky and/or polymer-containing composition. The system may also include a dryer configured to dry pellets of the tacky and/or polymer-containing composition as the pellets move along a pellet flow path through the dryer. At least a portion of the dryer can be configured to receive a counter flow of air at least partially opposite the pellet flow path. The system may further include a conduit configured to receive the dried pellets from the dryer. The conduit can include one or more blowers configured to direct the dried pellets from a pellet outlet of the dryer to the conduit via a transport flow of air. The system may also include a multi-port valve configured to continuously route an incoming flow of the pellets. The multi-port valve can have at least one inlet for receiving the incoming flow of pellets and a plurality of outlets for dispensing an outgoing flow of the pellets. The system may further include a plurality of bagging assemblies configured to alternatingly receive a predetermined quantity of pellets from one or more outlets of the plurality of outlets of the multi-port valve to allow continuous bagging of the pellets.

In some embodiments, the one or more blowers can be configured to suction a drying flow of air at least partially opposite a directional flow of the pellets towards the multi-port valve.

In other embodiments, the system for continuously bagging tacky and/or polymer-containing pellets can also include a conditioning unit configured to further dry and/or apply a coating powder to the dried pellets. The conditioning unit can be a tumbler.

In some embodiments, the system for continuously bagging tacky and/or polymer-containing pellets can also include material preparation steps such as mixing and melting via processes such as those disclosed in but not limited to WO 2007/103509 and WO 2007/064580, pelletizer(s), dryer(s), bagging machine(s), and pellet diverter valve(s). The system can further include a controller, such as a programmable logic controller (PLC), to control one or more process conditions relating to the operation of the material preparation, extrusion, pelletizer, dryer, pellet diverter valve(s) or diverter valve(s), and bagging machine valve(s).

A method for continuously bagging tacky and/or polymer-containing pellets can include pelletizing a tacky and/or polymer-containing mixture in a pelletizer and drying pellets of the tacky and/or polymer-containing mixture in a dryer. The method can also include conditioning the pellets in a conditioning unit. In some embodiments, conditioning the pellets can include further drying the pellets and/or applying a powder coating to the pellets. The method can further include continuously diverting a specific quantity of the pellets through one or a plurality of outlets of a multi-port valve. The method may also include continuously bagging the pellets using a bagging assembly positioned at one or more of the plurality of outlets of the multi-port valve.

In some embodiments, drying the pellets can include mechanically driving the pellets through the dryer along a pellet flow path and directing, along at least a portion of the pellet flow path, a counter flow of air at least partially opposite the pellet flow path. In these embodiments, the method can also include suctioning a transport flow of air to remove the pellets from the pellet outlet of the dryer. One or more blowers can be used to suction the transport flow of air. In some embodiments, the transport flow of air can be sufficient to overcome the counter flow of air at the pellet outlet of the dryer. The method for continuously bagging a tacky and/or polymer-containing formulation can also include directing the pellets from the pellet outlet of the dryer to the multi-port valve and suctioning, by the one or more blowers, a drying flow of air at least partially opposite a directional flow of the pellets towards the multi-port valve.

In other embodiments, drying the pellets can include mechanically driving the pellets through the dryer along a pellet flow path at least partially against a counter flow or fair. Conditioning the pellets can include applying the powder coating from a powder feeder to the pellets.

In further embodiments, drying the pellets in the dryer can include removing about 70 percent to about 75 percent of fluid from the pellets. Conditioning the pellets can include removing about 20 percent to about 30 percent of the fluid from the pellets.

It is possible for the tacky and/or polymer-containing formulation to be a tacky polymer-containing formulation. Specifically, the tacky polymer-containing formulation can be a hot melt adhesive, a pressure sensitive adhesive, a hot melt pressure sensitive adhesive, or asphalt.

The foregoing summarizes only a few aspects of the presently disclosed subject matter and is not intended to be reflective of the full scope of the presently disclosed subject matter as claimed. Additional features and advantages of the presently disclosed subject matter are set forth in the following description, may be apparent from the description, or may be learned by practicing the presently disclosed subject matter. Moreover, both the foregoing summary and following detailed description are exemplary and explanatory and are intended to provide further explanation of the presently disclosed subject matter as claimed.

BRIEF DESCRIPTION OF THE DRAWINGS

FIG. 7 is a schematic illustration of a double walled forming tube in accordance with some embodiments of the present invention.

FIG. 8b is a schematic illustration of a drying section of a continuous bagging system having a blower, in accordance with some embodiments of the present invention.

DETAILED DESCRIPTION

Figure 1:
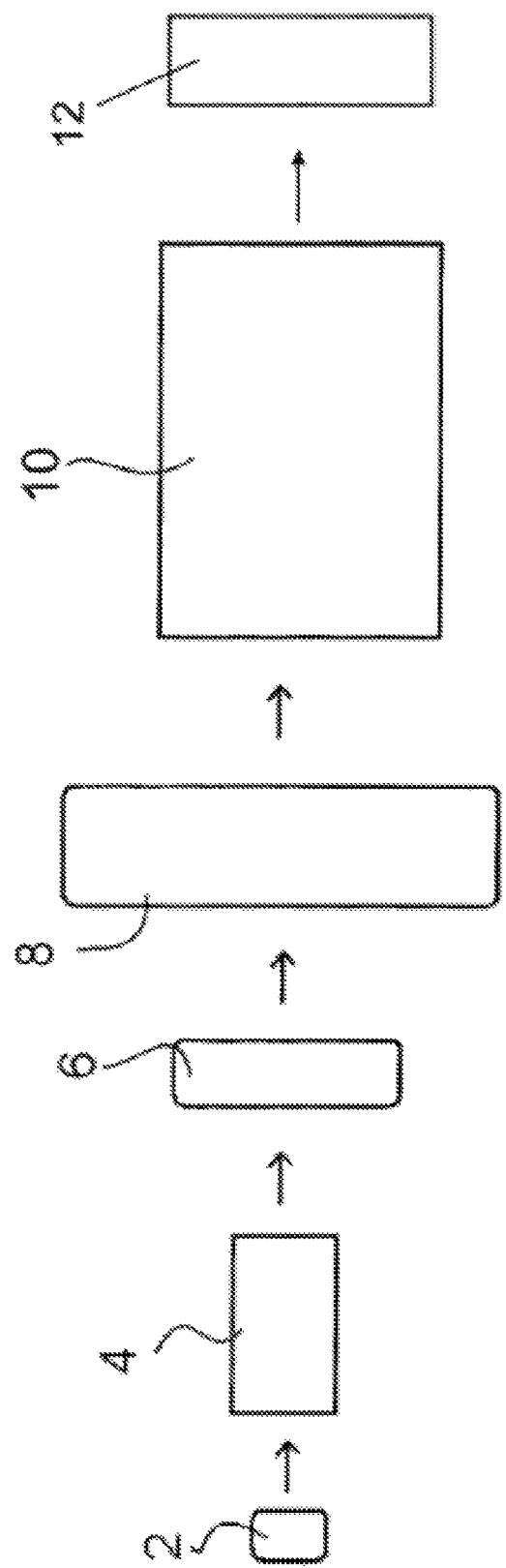
FIG. 1 is a schematic illustration of a continuous bagging process according to some embodiments of the present invention.

The various embodiments of the presently disclosed subject matter are described with specificity to meet statutory requirements. However, the description itself is not intended to limit the scope of this patent. Rather, it has been contemplated that the claimed subject matter might also be embodied in other ways, to include different steps or elements similar to the ones described in this document, in conjunction with other present or future technologies.

It should also be noted that, as used in the specification and the appended claims, the singular forms "a," "an" and "the" include plural references unless the context clearly dictates otherwise. References to a composition containing "a" constituent is intended to include other constituents in addition to the one named. Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose. The terms "first," "second," and the like, "primary," "secondary," and the like, do not denote any order, quantity, or importance, but rather are used to distinguish one element from another. Further, the terms "a", "an", and "the" do not denote a limitation of quantity, but rather denote the presence of "at least one" of the referenced item.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" may be used herein to connote different aspects of methods employed, the term should not be interpreted as implying any particular order among or between various steps herein disclosed unless and except when the order of individual steps is explicitly required.

The components described hereinafter as making up various elements of the invention are intended to be illustrative and not restrictive. Many suitable components that would perform the same or similar functions as the components described herein are intended to be embraced within the scope of the invention. Such other components not described herein can include, but are not limited to, for example, similar components that are developed after development of the presently disclosed subject matter.

To facilitate an understanding of the principles and features of the invention, various illustrative embodiments are explained below. In particular, the presently disclosed subject matter is described in the context of being improvements over existing individual processes and apparatuses, resulting in efficient continuous bagging processes and systems.

An exemplary continuous bagging system is shown schematically in FIG. 1. While the various embodiments of the present invention can involve tacky formulations, polymer-containing formulations, tacky polymer-containing formulations, and the like, for convenience, reference will be made below to tacky polymer-containing formulations. In some instances, such formulations will be referred to as polymeric materials. It should be recognized by those skilled in the art to which this disclosure pertains that the other types of formulations/materials can be interchangeably used in place of the tacky polymer-containing formulations in the description below.

The continuous bagging process shown in FIG. 1 includes a (i.e., at least one) feeding or filling section 2 that provides polymeric material (which, in exemplary embodiments, is a tacky polymer-containing material) into a mixing, melting and/or blending section 4. The mixing section 4 is coupled to a pelletizing section 6 which is subsequently connected via a transport system containing a pellet diverter valve(s), to a dewatering and/or drying device section 8. Upon exiting the drying section 8, pellets are led to a pellet diverting section 10. The pellets ultimately are fed into bagging device section 12.

An exemplary process for continuously bagging the tacky polymer-containing material generally includes feeding the tacky polymeric material from the feeding or filling section 2 to the mixing, melting, and/or blending section 4. Next, the tacky polymeric material is mixed, melted, and/or blended. This step can include extruding the tacky polymeric material. A further processing step includes pelletizing the material (i.e., in pelletizing section 6). After pelletization, the pellets are sent to a dewatering and/or drying device 8, via a transport system, where they are dried or dewatered. Upon drying, the pellets exit drying section 8 and enter pellet diverting section 10. Finally, the dried and diverted pellets are sent to the bagging section 12, where they are packaged for subsequent use.

Referring to the system shown in FIG. 1, the feeding or filling section 2 and the mixing, melting and/or blending section 4 can make use of any equipment or methods known by those skilled in the art to which this disclosure pertains. For illustrative convenience, however, reference is made to a feeding or filling section 2 and a mixing, melting and/or blending section 4 from which would sequentially follow a booster pump, melt pump, screen changer, heat exchanger, and polymer diverter valve(s) with side discharge. International Patent Application Publication Nos. WO 2007/123931 and WO 2007/064580 describe the use of such systems in greater detail. These references are incorporated herein by reference in their entireties as if fully set forth below. It will be clear, however, to those skilled in the art to which this disclosure pertains as to how other components can be substituted for those described herein without undue efforts.

In addition, while the various embodiments of the present invention relating to the system shown in FIG. 1 contemplate other types of pelletization, drying, and bagging equipment or methods, for illustrative convenience only these embodiments will be described as part of a system including an underwater pelletizer, centrifugal dryer, and a "vertical form, fill, and seal" bagging machine. For the sake of brevity (i.e., to minimize excessive text describing each of the various individual types of pelletization, drying, and bagging equipment and method steps, as well as combinations thereof, that can be implemented into the systems and methods described herein), it is to be understood that, by extension, any reference to underwater pelletizers, centrifugal dryers, and bagging machines is intended to include other types of pelletizers, dryers and bagging machines, respectively, whether used as substitutes for, or in conjunction with, those items described herein. It will be clear to those skilled in the art to which this disclosure pertains as to how such other components and process steps can be substituted for those described herein without undue efforts.

Further, while this disclosure might highlight only certain components of the underwater pelletizers, centrifugal dryers, and/or bagging machines that can be implemented in the continuous bagging systems and processes of the present invention, more detailed descriptions of the specific components of such equipment, and the processes for using such equipment, can be found in the various U.S. and foreign patents and patent applications of the assignee of the present application listed in the background section of the present application. Each of these patents and patent applications are incorporated by reference in their entireties as if fully set forth below.

Referring again to the continuous bagging system shown in FIG. 1, fittingly attached to, and just downstream of, the polymer diverter valve(s) of the mixing, melting and/or blending section 4 is pelletizing section 6. To elaborate briefly, the other types of pelletizers that can be used in the systems and processes described herein include prillers, roto-formers, hot face pelletizers, strand pelletizers, water-ring pelletizers, and underwater pelletizers.

A bypass loop (not shown) can be used as part of pelletizing section 6. Transportation fluid can be obtained from a reservoir (not shown) or other sources, and is transported toward a transport fluid box or waterbox (not shown) a through pump (not shown) that can be of a design and/or configuration to provide sufficient fluid flow into and through an optional heat exchanger (not shown) and a transport pipe to and into the bypass loop. The heat exchanger similarly can be of a design of suitable capacity to maintain the temperature of the transport fluid at a level appropriately suitable to maintain the temperature of the pellets being formed such that pellet geometry, throughput, and pellet quality are satisfactory without tailing, and where wrap-around of molten material on the cutter or cutting face, agglomeration of pellets, cavitation, and/or accumulation of pellets in the transport fluid box or waterbox are maximally avoided.

The temperature, flow rate, and the composition of the transport fluid will vary with the material or formulation being processed. Transport medium/fluid temperatures are preferably maintained at least approximately 20° C. below the melting temperature of the polymer. For tacky or sticky polymers, the transport medium/fluid is generally maintained at a temperature between approximately 30° C. to approximately 250° C. below the melt temperature of the polymer, which will often be below 10° C. so as to minimize adhesion of the pellets to any surfaces of the components of the system and/or agglomeration of the pellets to one another. In some instances, the transport fluid temperature is maintained between approximately −100° C. to approximately 90° C., and also can be maintained between approximately −50° C. to approximately 40° C., and can even be maintained between approximately −20° C. to approximately 10° C. Depending on the desired temperature of the transport fluid/medium, the transport fluid/medium can be water, an alcohol (including mono-hydroxy alcohols, diols, triols, and higher order alcohols), and/or another liquid that has a freezing point below that which is desired for use during the processing. Mixtures of different transport fluids can also be used. For example, in certain embodiments, a mixture of water and a glycol can be used as the transport fluid.

Additionally, processing aids, flow modifiers, surface modifiers, coatings, surface treatments (e.g., anti-static compositions), and various other additives known to those skilled in the art can be accommodated in the transport fluid. These optional additives can be used to depress the freezing point of the transport fluid so as to extend the range of temperatures that a particular transport fluid composition can be used. U.S. Pat. Nos. 6,120,899, 6,238,732, 5,869,555, and 5,942,569; and International Patent Application Publication No. WO 2007/0103509 describe the use of different transport fluids in conjunction with some of these additives in greater detail. These references are incorporated herein by reference in their entireties as if fully set forth below.

Piping, valving, and bypass components should be of suitable construction to withstand the temperature, chemical composition, abrasivity, corrosivity, and/or any pressure requisite to the proper transport of the pellet-transport fluid mixture. Any pressure required by the system is determined by the vertical and/or horizontal transport distance, pressure level needed to suppress unwanted volatilization of components or premature expansion, pellet-transport fluid slurry flow through valving, coarse screening, ancillary process and/or monitoring equipment. Pellet-to-transport fluid ratios should similarly be of varying proportions to be satisfactorily effective in eliminating or alleviating the above-mentioned complicating circumstances (e.g., pellet accumulation, flow blockage or obstruction, and agglomeration). Piping diameter and distances required are determined by the material throughput, thus the flow rate and pellet-to-transport fluid ratio, and time required to achieve an appropriate level of cooling and/or solidification of the pellets to avoid undesirable volatilization and/or premature expansion. For example, increasing the piping diameter and/or distance between the pelletizer to the dryer is one mechanism to provide additional cooling to the pellets.

Valving, gauges, or other processing and monitoring equipment should be of sufficient flow and pressure rating as well as of sufficient diameter to avoid undue blockage, obstruction or otherwise alter the process, leading to additional and undesirable pressure generation or process occlusion. The transport fluid and optional additive compositions should be compatible with the components of the pellet formulation and optionally can be readily absorbed into or adsorbed onto the components in that formulation. Excess transport fluid and/or additives should be readily removable from the pellets by such methods as rinsing, aspiration, evaporation, dewatering, solvent removal, filtration, or similar techniques as understood by those skilled in the art.

Surface treatments can be applied to the pelletization equipment used in pelletizing section 6 to reduce abrasion, erosion, corrosion, wear, and undesirable adhesion and stricture. In addition, the pelletization equipment can be nitrided, carbonitrided, metallized by sintering, and/or electrolytically plated. Other surface treatments for improvement of surface properties, enhancement of corrosion and abrasion resistance, improvement of wear, and/or reduction of clumping, agglomeration, and/or stricture also can be used on the pelletization equipment of pelletizing section 6. It should be noted that such coatings also can be applied to the various components of the drying, transportation, and bagging sections of the systems and processes disclosed herein.

After pelletization, the transport medium transports the pellets to dewatering and/or drying section 8. To elaborate briefly, the other types of equipment that can be in dewatering and/or drying section 8 of the systems and processes described herein include one or more of a centrifugal dryer, fluidized bed dryer, tumble dryer, and/or desiccant dryer. This section is designed to provide a controlled level of moisture for materials such as, but not limited to, flakes, globules, spheres, cylinders, or other geometric shapes. This can be achieved by, but is not limited to, filtration, vibratory filtration, centrifugal drying, forced or heated air convection, rotational drying, vacuum drying, or a fluidized bed. Again, for the purposes of this disclosure, reference is made to a centrifugal dryer. An exemplary centrifugal dryer 200 is illustrated in FIG. 2.

Figure 2:
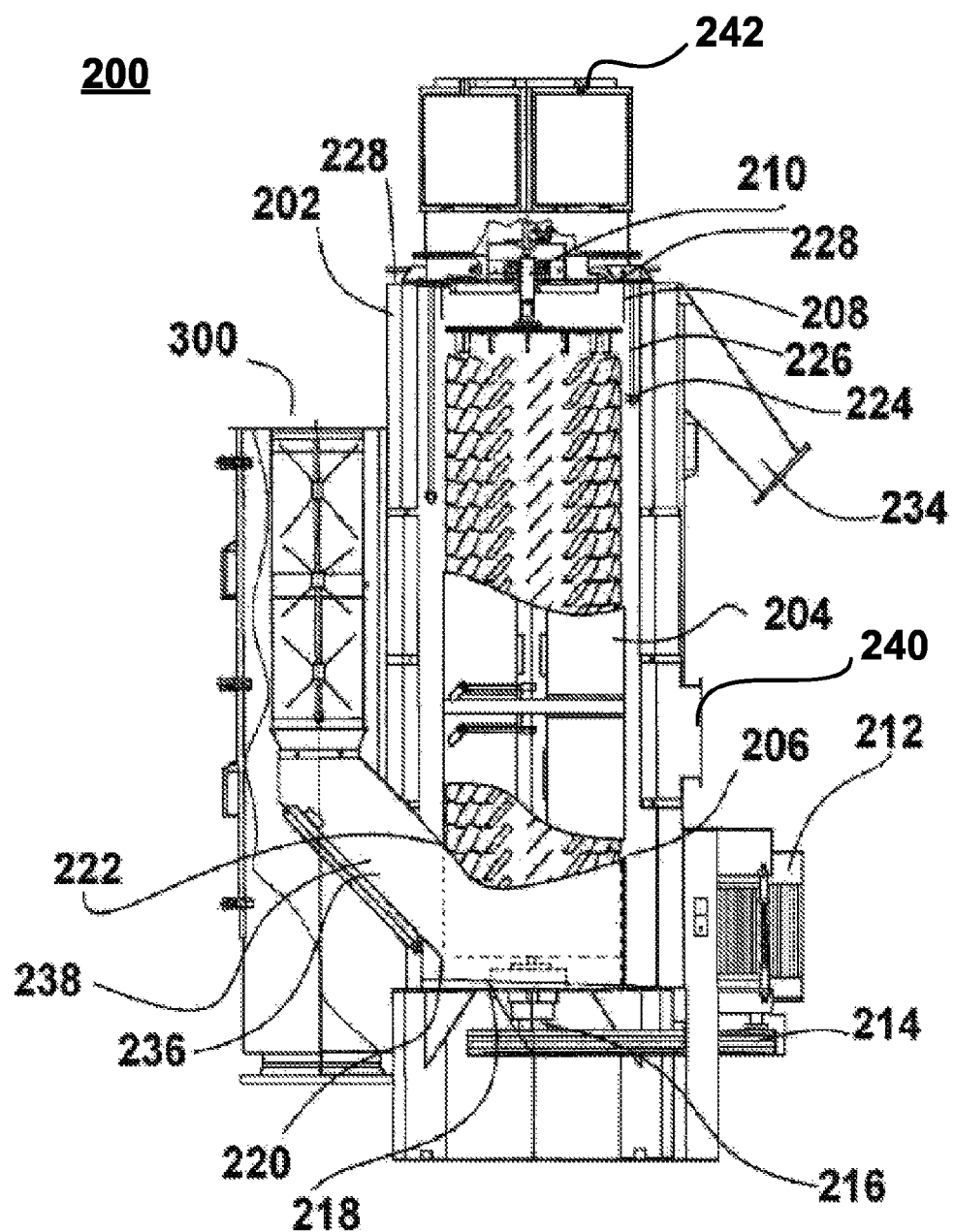
FIG. 2 is a schematic illustration of a centrifugal dryer in accordance with some embodiments of the present invention.
Figure 3:
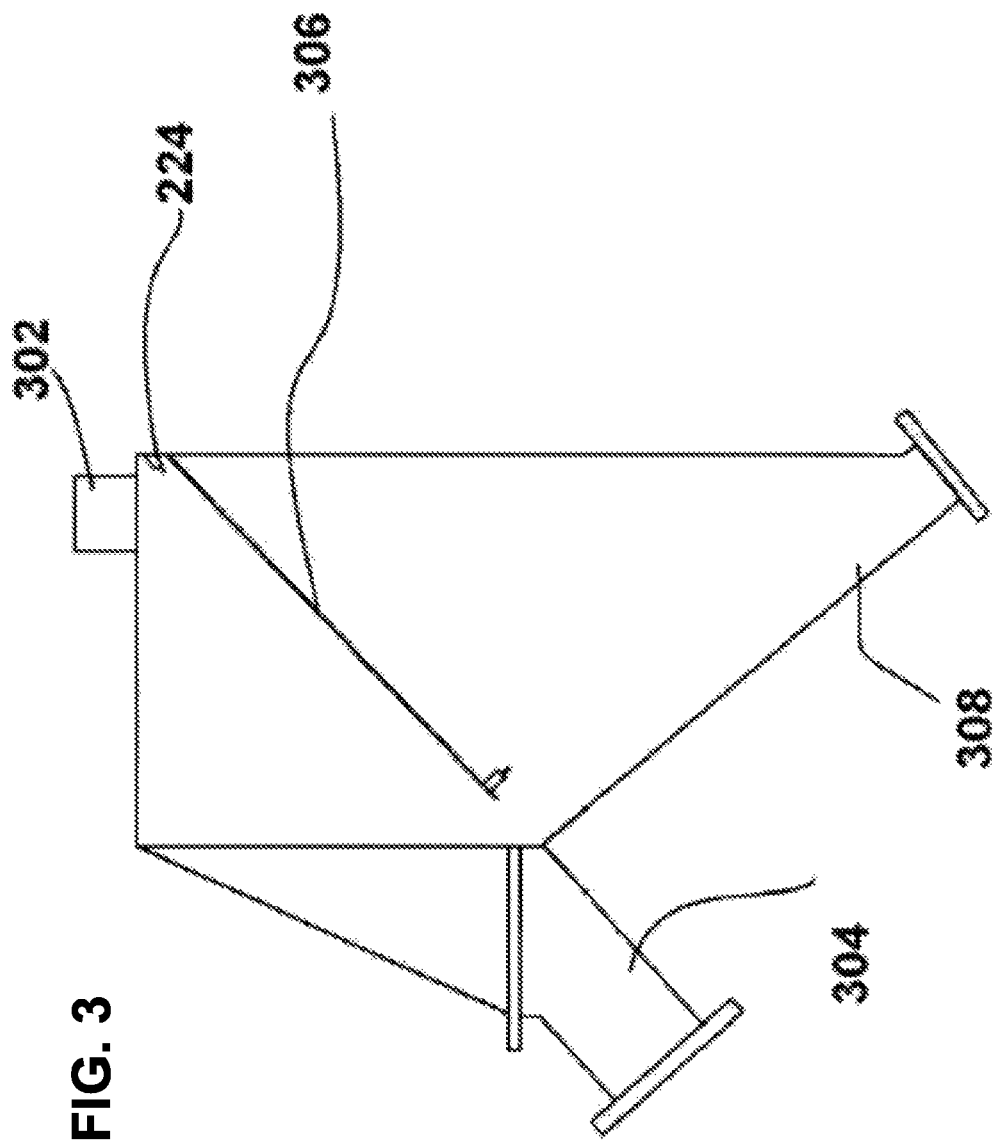
FIG. 3 is a schematic illustration of an agglomerate catcher for the centrifugal dryer of FIG. 2 in accordance with some embodiments of the present invention.

The underwater pelletizer of section 6, and optionally other upstream processes, are coupled to dryer 200 by way of transportation pipe 302, which is shown in FIG. 3. Transportation pipe 302 can be connected to both pelletization section 6 and agglomerate catcher 300. Agglomerate catcher 300 in FIG. 3 is considered to be part of centrifugal dryer 200 shown in FIG. 2. Transportation pipe 302 discharges the pellets and fluid slurry (or concentrated slurry) into agglomerate catcher 300, which then catches, removes and discharges pellet agglomerates through a discharge chute 304. Agglomerate catcher 300 includes an angled round bar grid, perforated plate, or screen 306 that permits passage of fluid and pellets but collects adhered, clumped, or otherwise agglomerated pellets and directs them toward the discharge chute 304. The pellets and fluid slurry then optionally, but preferably, pass into a dewatering unit 400, which is shown in FIG. 2 but is detailed in FIG. 4, by way of feed chute 308, which is shown in FIG. 3. Dewatering unit 400 includes at least one vertical or horizontal foraminous membrane screen 402 containing one or more baffles 404 and/or an inclined foraminous membrane screen 406 that enables fluid to pass downwardly into a fines removal screen (not shown) and therethrough to a reservoir (not shown). Dewatering unit 400 can be attached to agglomerate catcher 300 in a number of ways, but is preferably fixedly attached to the end of feed chute 308. The pellets are then discharged from dewatering unit 400 into the lower end of the centrifugal dryer 200 by way of pellet inlet chute 236, as shown in FIG. 2.

Pellet inlet chute 236 connects to the end of dewatering unit 400. It can be fixedly attached or detachable. While pellet inlet chute 236 may have any shape (e.g., square, rectangular, triangular, round, elliptical, or the like), it is preferably square-shaped. In addition, one or more walls 238 of pellet inlet chute 236 can be of solid or perforated construction. In one embodiment, the walls 238 are made partially of solid construction and partially of perforated construction. In another embodiment, the walls 238 of pellet inlet chute 236 are of solid construction.

As illustrated in FIG. 2, dryer 200 includes, but is not limited to, a generally square-shaped housing 202 having a vertically oriented generally cylindrical screen 204 mounted on a cylindrical screen support 206 at the base of the screen 204, and a cylindrical screen support 208 at the top of the screen. The screen 204 is thus positioned concentrically within the housing 202 in radially spaced relation from the inside wall of the housing.

In some embodiments, a solid screen (e.g., non-perforated sheet metal) (not shown) is also included at the bottom of the dryer 200. A solid screen can provide additional cooling and friction reducing mechanisms for the pellets because it allows for the transport fluid to remain on its surface, thereby providing additional time during which the pellets can remain in contact with the colder transport fluid.

A vertical rotor 210 is mounted for rotation within the screen 204 and is rotatably driven by a motor 212 that can be mounted at and/or connected to the base of the dryer or at the top of the dryer and is preferably mounted at and or connected to the base of dryer 200. The motor 212 is connected to the rotor 210 by a drive pulley 214 and through a bearing 216 connected with the lower end of the housing. The interior dryer bottom 218 supports the rotor 210 and guide the rotational movement of the lower end of the rotor. Pellet inlet chute 236 is in communication with the lower end of the screen 204 and rotor 210 through the lower screen support section 220 at connection 222, and the upper end of the housing and rotor is in communication with pellet exit chute 234, through a connection (not shown) in the upper screen support section 208 at the upper end of the housing.

The optional self-cleaning structure of the dryer 200 includes a plurality of spray nozzles or spray head assemblies 224 supported between the interior of the housing 202 and the exterior of the screen 204 as illustrated in FIG. 2. Spray head assemblies 224 are optionally placed in agglomerate catcher 300 (shown in FIGS. 2 and 3). FIGS. 2 and 3 additionally illustrate an exemplary placement of spray head assembly 224. The spray head assembly 224 of FIG. 2 is supported at the end of spray pipes 226 extending upwardly through top plate 228 at the upper end of the housing with the upper ends (not shown) of the spray pipes 226 being exposed. Hoses or lines (not shown) feed high pressure fluid (e.g., water) at a flow rate of at least approximately 40 gallons per minute (gpm), and preferably about 60 gpm to about 80 gpm, and more preferably at approximately 80 gpm or higher to the spray nozzles 224. The hoses can optionally feed off a single manifold (not shown) mounted on the dryer 200.

In some embodiments, a counter flow of air may be directed through a portion of the dryer 200 to help contain moisture within the dryer. For example, a blower may suction air out of the dryer 200 through an opening 240. The air may enter the dryer 200 through one or more air vents 242 located at the top of the dryer 200 and/or through the pellet exit chute 234. The air vents 242 may filter the incoming air to prevent unwanted objects or particles from entering the dryer 200. In other embodiments, the opening 240 may be closed and a blower may be housed within the dryer 200 and configured to draw air in from the air vents 242 and/or the pellet exit chute 234.

Various rotor assemblies and lifter configurations can be used. These include, but are not limited to, segmented rotor assemblies, solid rotor assemblies, and the like.

After the pellets exit centrifugal dryer 200 at its upper end (at pellet exit chute 234) they are sent, via piping, to a diverter valve. Optionally, a diverter valve (not shown) is coupled to pellet exit chute for the purpose of diverting pellets from continuing onward to pellet diverter section 10 and bagging section 12. Should there be problems with machinery in pellet diverter section 10 and/or bagging section 12, should the pelletized material not meet specifications, or should there be any other reason why an operator does not want the pelletized material to continue on to any further processing, the operator can use the diverter valve to divert the pellets from further processing.

Figure 5A:
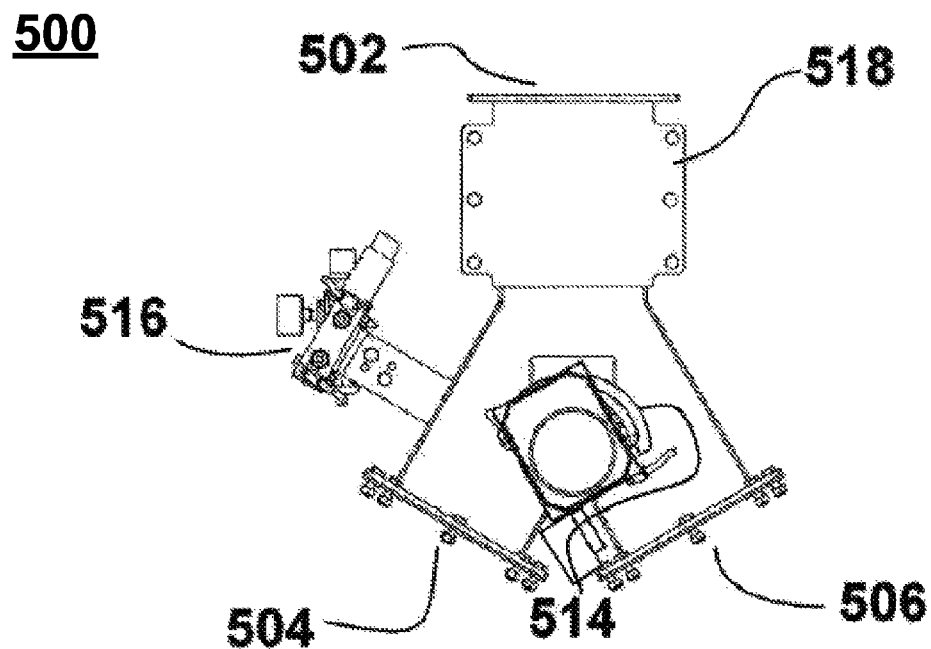
FIG. 5a and FIG. 5c are schematic illustrations of a pellet diverter valve in accordance with some embodiments of the present invention.
Figure 5C:
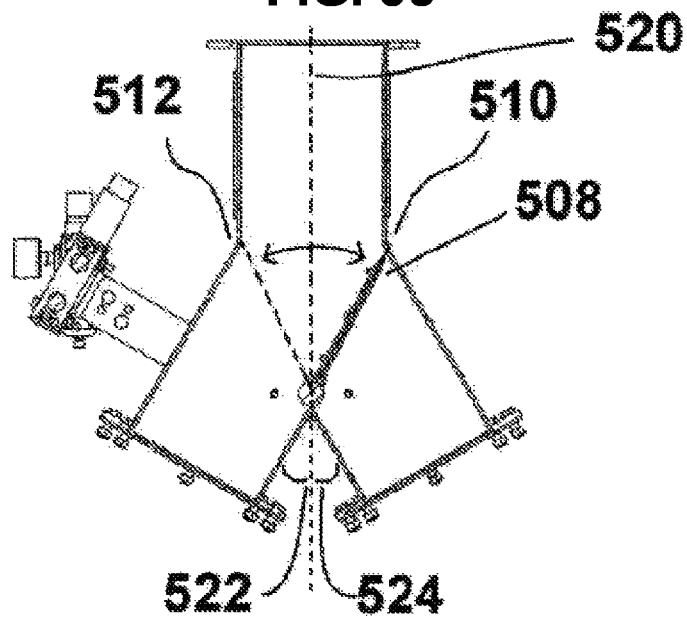
Figure 5B:
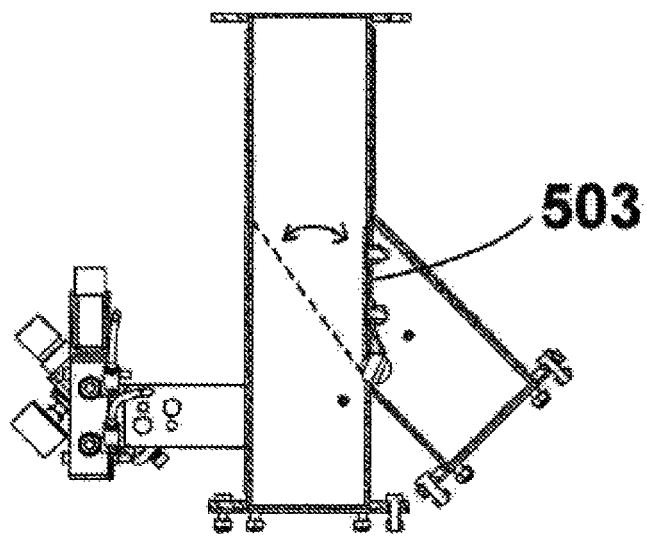
FIG. 5b is a schematic illustration of a prior art pellet diverter valve.

An exemplary pellet diverter valve, in accordance with some embodiments of the present invention, is illustrated in FIGS. 5a and 5c. Pellet diverter valve 500 was developed, in particular, to overcome the many problems associated with pelletizing and drying tacky polymeric materials. By way of comparison, FIG. 5b illustrates a prior art pellet diverter valve 501. When diverting tacky polymer pellets, it was found that the design of prior art pellet diverter valve(s) 501 was not suitable to efficiently and reliably divert pellets during operating conditions, owing to the angle of pellet diverter plate 503 in relation to the incoming pellets.

During operation of prior art pellet diverter valve 501, tacky pellets would hit diverter plate 503 with such velocity as to cause them to adhere and remain to the diverter plate 503. Subsequently, additional tacky pellets would continue to accumulate, causing a back-up in pellet exit chute 234 (shown in FIG. 2) and eventually requiring shut-down of the system.

Referring now to FIGS. 5a and 5c, the pellet diverter valve(s) 500 of the present invention has been designed specifically for operation with tacky polymeric materials. Again, other polymeric materials also can be processed (i.e., diverted) using the pellet diverter valve 500. During operation, pellets enter pellet diverter valve(s) 500 at inlet 502 which is directly coupled or indirectly coupled (i.e., via an intermediate device) to pellet exit chute 234. In exemplary embodiments, pellet diverter valve 500 is detachably connected to pellet exit chute 234 via an extension pipe. When the pellets enter pellet diverter valve 500 they will flow continuously through one of the two pellet diverter valve outlets or exit chutes 504 or 506. The specific outlet through which the pellets will flow depends on the position of diverter flap 508. The position of diverter flap 508 can be controlled by hand or, preferably, by a controller (e.g., a PLC) (not shown).

Movement of diverter flap 508 can be accomplished in a variety of ways including one or more of manually, pneumatically, electronically, automatically, or hydraulically; and the diverter flap 508 can optionally be controlled by a PLC. In exemplary embodiments, diverter flap 508 is controlled by pneumatic actuator 514 that is operated by an electronically controlled solenoid valve 516, which is controlled by a PLC.

In some cases, when a PLC is used to control the pellet diverter valve(s) 500, the solenoid valve(s) can include needle valves (not shown) that can be used to control the diverter flap 508 speed. In controlling the speed of the diverter flap 508, the needle valves minimize the possibility of trapping a pellet between the diverter flap 508 and the interior walls of the pellet diverter valve(s) 500. Furthermore, the needle valves reduce the effects of the impact of the diverter flap 508 against these walls, therefore decreasing wear and increasing the longevity of the pellet divert valve(s) 500.

Wall plate 518 can be detachable, so as to allow easy access to the inner mechanisms of pellet diverter 500. For example, the detachability of wall plate 518 enables operators to inspect, clean, and/or repair any of the inside surfaces of pellet diverter valve(s) 500 with minimum down time. Detachable wall plate 518 can be made from a metal or alloy (e.g., stainless steel). Alternatively, detachable wall plate 518 can be made from a transparent material that will allow an operator to continuously monitor and observe the conditions (e.g., the flow of pellets) within the pellet diverter valve(s) 500. It should be recognized that detachable wall plate 518 can be disposed on any side wall of the pellet diverter valve(s) 500. To further aid an operator in observing the interior of the pellet diverter valve 500, the detachable wall plate 518, or another portion of the inside or outside of pellet diverter valve 500, can be equipped with an optional light source, such as a strobe light, to illuminate the interior of the pellet diverter valve 500 and/or a video camera so as to allow the operator(s) to view the interior of pellet diverter valve 500 to monitor for problems.

It is to be understood that the dimensions of pellet diverter valve 500 can vary based on the capacity of the equipment used in the process, the scale of the particular production run, and other like factors. Further, the pellet diverter valve(s) 500 can be formed from any material that can withstand the conditions to which it will be exposed (e.g., velocity of the pellets impinging on its interior surfaces, temperature of the pellets, and the like). In exemplary embodiments, the pellet diverter valve(s) 500 is formed from stainless steel.

The pellet diverter valve(s) 500 generally can have an inverted "Y" shaped design. This design incorporates an angle of repose that reduces and/or eliminates the problem of pellets accumulating on diverter flap 508. Dotted line 520 runs through the middle of pellet diverter inlet 502 and is the axis upon which the following angles will be based. Angles 522 and 524, independently, can range from about 0° to about 90°, preferably from about 15° to about 60°, more preferably from about 25° to about 45°, and are most preferably about 30°.

To further enhance the effectiveness of pellet diverter valve(s) 500, surface coatings can be applied to all internal surfaces that may come into contact with the pellets to reduce and/or eliminate corrosion, erosion, and/or adherence. Such coatings are described hereinabove. Additional examples of such coatings are provided in commonly-assigned U.S. patent application Ser. No. 11/932,067, which is incorporated herein by reference as if fully set forth below.

In some cases, the pellets may be sufficiently tacky to warrant a powder coating. In other instances a powder coating on the pellets may be desired. Regardless of the motivation, the powder coating can be applied to the pellets upon exiting of the dryer from exit chute 234 and before entry into the pellet diverter valve(s) 500. This can be accomplished by coupling a feeder or feeders (not shown) such as a volumetric and/or gravimetric type feeder that supplies the powder to the exit chute 234 or the piping between exit chute 234 and the diverter valve(s) (not shown). The feeder distributes the powder to the pellets as they traverse the exit chute 234 or the piping between exit chute 234 and the diverter valve (not shown). This pellet diverter valve would most preferably be located immediately after the feeder or feeders.

Upon exiting pellet diverter valve outlet 504 and/or 506, the pellets will undergo a bagging step referenced in FIG. 1 as bagging section 12. Bagging section 12 can incorporate one or more bagging machines to package the pellets. In exemplary embodiments, bagging section 12 employs two separate bagging machines.

It is important to note that more than two bagging machines can be used in the processes and systems disclosed herein. In order to do so, additional outlets would be necessary on the pellet diverter valve. Alternatively, additional pellet diverter valves could be used downstream of the pellet diverter valve described above. For example, a series of three pellet diverter valves can be daisy-chained to produce four outlets for the initial inlet. These four outlets could feed up to four separate bagging machines. In another example, seven pellet diverter valves can be daisy-chained to produce eight outlets for the initial inlet. These eight outlets could feed up to eight separate bagging machines. This daisy-chaining concept can, in theory, be extended infinitely if the volume or production rate of pellets demanded it.

Pellet diverter valve outlets 504 and 506 can have different dimensions if desired. Preferably, they are of the same dimension so that the distance the pellets must travel upon entering pellet diverter valve 500 to a respective bagging machine is the same. In addition, outlets 504 and 506 can be detachably coupled (either directly or indirectly) to their respective bagging machines. In some embodiments, there may be a gap between outlets 504 and 506 and their respective bagging machines where the pellets can free flow from the outlets 504 and 506, through the gap, and into the respective bagging machine.

Figure 6:
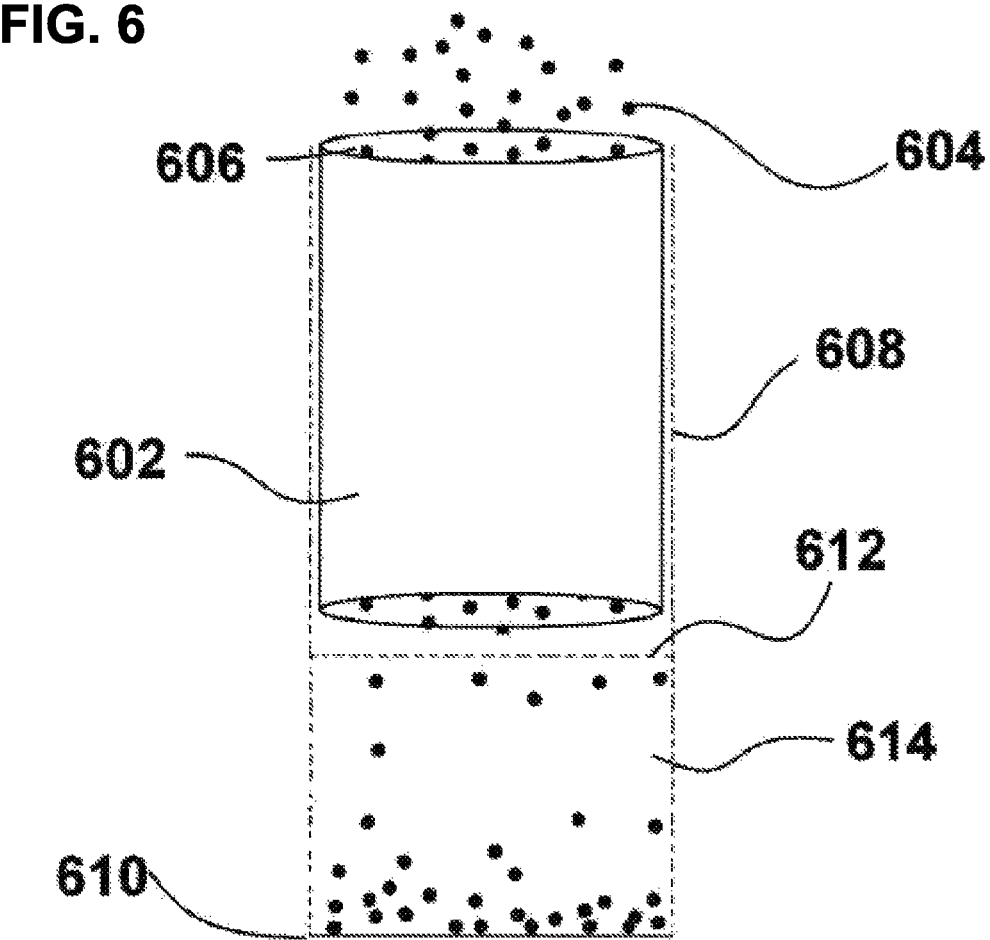
FIG. 6 is a schematic illustration of a bagging portion in accordance with some embodiments of the present invention.

Free flowing from the exit of centrifugal dryer 200, the pellets flow through pellet diverter valve(s) 500 and into a forming tube of a bagging machine. The forming tube, which is shown in FIG. 6 and designated by reference number 602, serves to funnel the pellets into a bag, as well as to hold the bag open for the entry of the pellets. Forming tube 602 can be surface treated to reduce and/or eliminate corrosion, erosion, and/or adherence as described hereinabove for the various other components of the processes and systems of the present invention.

Several factors can determine how much material will flow into pellet diverter 500 and out of pellet diverter valve outlet 504 or 506. These include the production rate of the pellets and the length of time that diverter flap 508 is in position 510 or 512. The length of time that diverter flap 508 stays in position 510 or 512 will depend in part on the amount of pellets desired in a particular bag.

A single PLC (not shown) can control pellet diverter valve(s) 500 and each of the bagging machines (not shown). The PLC can be capable of operating pellet diverter valve(s) 500 so that diverter flap 508 stays in position 510 or 512 for equivalent or different time lengths. To produce bagged material of different sizes, the PLC can allow for diverter flap 508 to stay in either position 510 or 512 longer than the other of position 512 or 510, thus allowing one bagging machine for example to produce one-pound bags while the other bagging machine produces two-pound bags. Similarly, if more than one pellet diverter valve 500 and/or two bagging machines are used, the PLC can control each of these components as well.

Alternatively, one PLC can control each of the components of the processes and systems through the diverter valve(s), while the bagging section 12 has one PLC to control all of the bagging machines. It is also possible for each bagging machine in bagging section 12 to have a separate PLC instead of one PLC for all of the bagging machines. In some situations, separate PLCs can be used in conjunction to control the bagging step of the processes and systems. For example, one PLC can control when individual bags are prepared by the bagging machines, while another PLC can control other parameters of the bagging step (e.g., how large the bag must be, when and how long the seal should be applied, temperature of the seal, and the like).

There can be a wide variance in the size of the final bagged product due to the various options available to the operator as has been described thus far, but also due to an error in reproducibility. That is to say that the filled and sealed bags may vary in weight, weighting more or less than what was desired. To alleviate and offset this error in reproducibility and the effect that it can have on the total weight of a large amount of filled bags, a scale can be, and most preferably is, installed downstream of the bagging units. The scale can be used to confirm the final weight of each bag and/or take the average of one or more bags and relay the information back to the PLC to make adjustments to the timing of the movement of the diverter flap 508. Preferably, the scale will take the average weight of two or more bags and relay the information back to the PLC.

For example, if one desires to produce 50 one-pound bags, yet the average weight of the first three bags in the process is 1.02 pounds each, the scales can relay such information back to the PLC so that it can make an adjustment to diverter flap's 508 timing. In this example the PLC would speed up diverter flap 508 so that the bags would be open to the flow of pellets for less time, decreasing their total amount of pellets provided to the bag and thus arriving at or closer to the desired weight to offset the previous error in weight. The scale used with the present invention optionally has the ability to be programmed to determine which bag came from which bagger. This option allows the scale to relay to the PLC exactly which bagger is producing bags below or above the desired weight.

Optionally, the PLC will automatically trigger an alarm system to alert the operator(s) when adjustments are being made to offset the error in reproducibility yet are not correcting the error.

In addition, the bagging machines optionally can be equipped with the vacuum capabilities to evacuate air from the bags. The vacuum capability allows removal of countercurrent air so as to gently remove air from the bags after the pellets have been placed inside, but before the bag is sealed, and to remove undesirable materials such as excess powder, moisture, dust, and other fragments.

Excess powder, dust, and other fragments can collect on the interior and exterior surfaces of the bags, and can create problems during sealing. The vacuum can be pulled from various locations in bagging section 12. Most preferably the vacuum is pulled from under the forming collar 701 out of forming tube 602 (shown in FIG. 7), therefore drawing countercurrent air from the forming tube. The amount of vacuum pulled is adjustable and the timing of such is optionally adjustable or continuous. When powder applications are involved, a vacuum will most preferably be used continuously. The double walled construction illustrated in FIG. 7 of forming tube 602 aids in dissipating heat given off from the sealing mechanisms and acts as a thermal barrier to minimize condensation build-up.

Interior walls 704 are most preferably coated to prevent adherence, corrosion, and abrasion since they come into contact with the pelletized materials. The vacuum capabilities previously mentioned also benefit from the double walled construction of forming tube 602. The exterior walls of the forming tube 602 are designated by number 706. The inlet/outlet port 708 of forming tube 602 can be located at various positions along the exterior wall 706 of forming tube 602 and is most preferably located in the upper region of forming tube 602. It is possible to vacuum air and/or particles from forming tube 602 (indicated by the arrow in FIG. 7), but also to blow air into forming tube 602 (indicated by an arrow). This may be desirable when the pellets begin to adhere to each other, to the equipment, or when cooling of pelletized material and/or equipment is desired.

Prior to the film being formed into a bag, the film optionally can be perforated. By creating small perforations in the film, air and moisture can escape the bag. This feature is of great importance as the presence of even a small amount of moisture in the bag can be problematic in later processing of the pellet (e.g., during the melting of the bagged material in a melting pot). The film may be perforated at any time, but is preferably perforated just before it passes over forming collar 701. The number of perforations on each bag can vary. Generally speaking, the larger the bag the more perforations are desired. For example, in certain exemplary embodiments, there are about 64 perforations for every about 9.25 inches of film. Thus a one-pound bag that measures about 9.25 inches in length would have about 64 perforations.

The size of the perforations can be of various diameters, but are preferably less than about 0.04 inches, and most preferably less than about 0.024 inches in diameter. The film can be perforated in various ways known to those skilled in the art. For example, the film can be perforated by a roller containing a plurality of sharp points that perforate the film as the film rolls across rollers and makes its way from the roll of film to forming collar 701.

FIG. 6 illustrates a portion of the bagging machine(s) of bagging section 12. The bagging machine can be any type of bagging machine known to those skilled in the art to which this disclosure pertains. In exemplary embodiments, the bagging machine is a so-called "vertical form, fill, and seal" bagging machine.

With pellets 604 falling downwardly through forming tube inlet 606, pellets continuously fall into a suitable bagging material 608 that is placed around and below the forming tube 602. Solid line 610 represents the bottom of bagging material 608, which is created by a suitable horizontal sealing mechanism (not shown). The seal 610 can be created using any known sealing means, but is preferably created by fusing the bagging material 608 unto itself with a horizontal heating element.

Dotted line 612 represents the top of bag 614, and what will be the bottom of a subsequent bag in the production process. The seal at dotted line 612 can be created by the same process described above for solid line 610.

The bagging material 608 can be of any material that is suitable for holding the pellets. It is preferably made of a composition that is capable of being melted with the pellets and blendable into the melted pellet composition, such as those commercially available under the names Petrothane 421 and Lacquene. The composition and thickness of bagging material 608 is chosen so as not to adversely affect the desired properties of the composition of the pellets when blended into same. The melting temperature of the bagging material 608 should be sufficiently close to, and preferably below, that of the composition of the pellets. Otherwise, when the pellets are melted, the bagging material 608 will coagulate and could float and/or cause blockages in application equipment. In some cases, the thickness of the bagging material 608 can be about 12.0 mil (i.e., one mil is equal to 0.001 inches and 0.025 millimeters) to about 0.5 mil, preferably from about 6.0 mil to about 0.7 mil, more preferably from about 4.5 mil to about 0.75 mil, and most preferably from about 2.0 mil to about 0.8 mil, so as to minimize the amount of bagging material 608 in the total blend or melted composition (comprising the bagging material and the pellets). The formulation of the bagging material 608 can include various additives (e.g., anti-foaming agents, anti-oxidants, stabilizers, and the like) in its formulation so as to facilitate and enhance the processing of the blend or melted composition.

Additional details regarding these properties, and others, of the bagging material 608 in relation to that of the pellets are described in Reissued U.S. Pat. No. 36,177, which is incorporated herein by reference in its entirety as if fully set forth below. In addition, difficulties can arise with the use of such thin films and one must take into consideration the optimum amount of heat to use to seal the film and form the bags. If too much heat is used, the film can burn and a sufficient seal will not be formed. If too little heat is used, a sufficient seal will not be formed. By way of example, it has been found that a 1 mil film can be properly sealed without burning at about 270 degrees Fahrenheit.

It should be noted, however, that there are benefits to the use of very thin films. By reducing the overall amount of film that must be used, costs can be reduced. Additionally, in situations where the film is melted with the pellets, when thinner films are used, less film will eventually be melted and blended with the material composition, thus reducing coagulates, impurities, and the chances of foaming or other undesirable reactions.

Figure 8A:
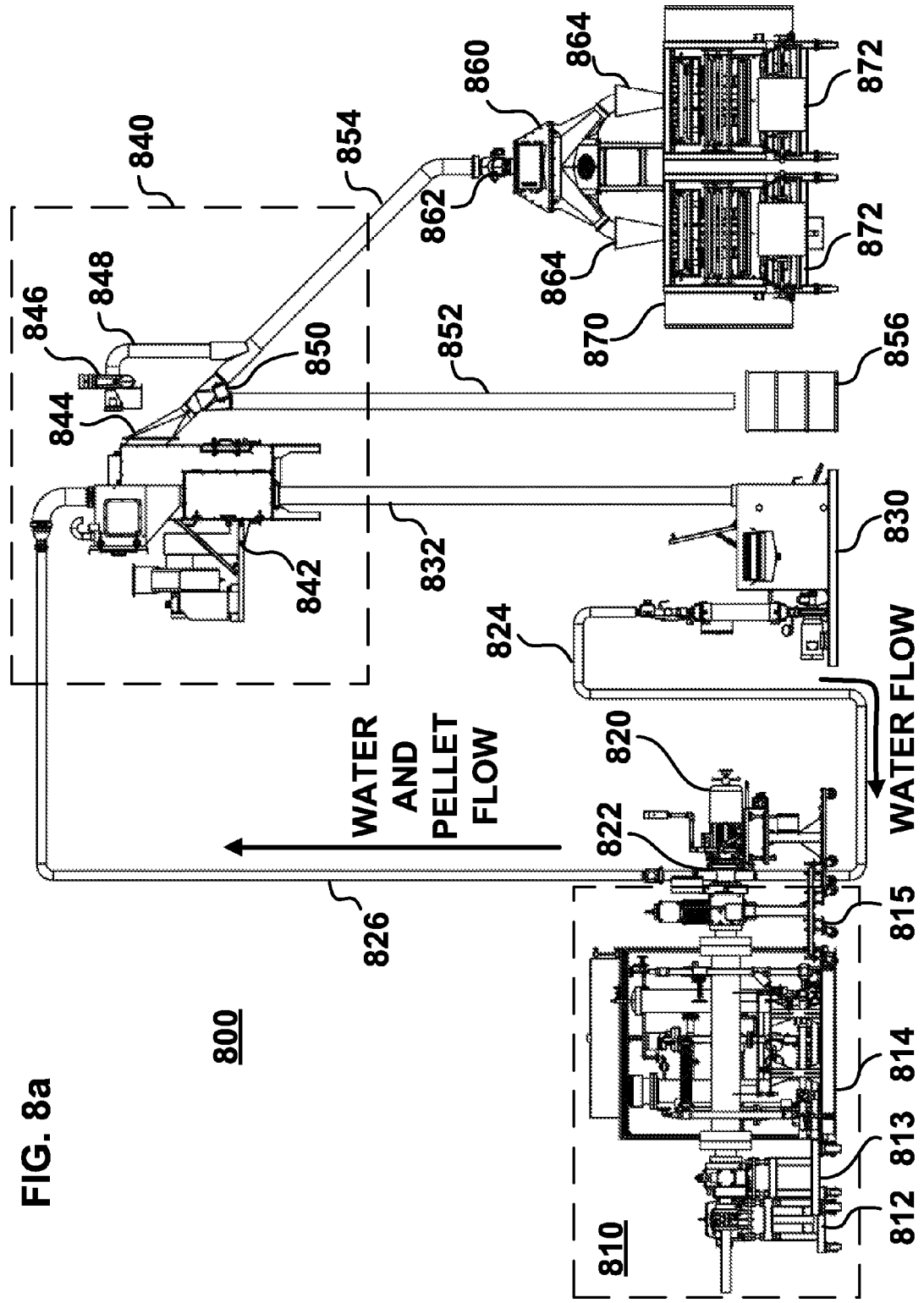
FIG. 8a is a schematic illustration of a continuous bagging system having a blower, in accordance with some embodiments of the present invention.

FIG. 8*a* shows an embodiment of a continuous bagging system 800 configured to continuously bag pellets while drying the pellets better than existing systems. The continuous bagging system 800 may include a melt line 810, a pelletizer 820, a tempered water system ("TWS") 830, a drying section 840, a multi-port valve 860, and a bagging assembly 870.

The melt line 810 may include a melt pump 812, a melt filter 813, a melt tempering unit 814, and a polymer diverter valve 815, and may be part of the mixing section 4 described with respect to FIG. 1 and in more detail in International Patent Application Publication Nos. WO 2007/123931 and WO 2007/064580. Optionally, an extruder and/or a booster pump may be positioned upstream of the melt line 810. The melt pump 812 and melt filter 813 may receive and filter a tacky and/or polymeric material before passing it on to the melt tempering unit 814. In some embodiments, the melt filter 813 may include screens to prevent paper, rocks, and other undesired materials that may have been accidentally dropped into the tacky and/or polymeric material from being directed to the pelletizer 820, thereby helping the tacky and/or polymeric material to keep its desired properties and protecting the components of the continuous bagging system 800. The melt tempering unit 814 may receive the tacky and/or polymeric material before directing it to the polymer diverter valve 815. In some embodiments, the melt tempering unit 814 may re-melt the tacky and/or polymeric material. The polymer diverter valve 815 may divert the tacky and/or polymeric material to the floor or to the cutter of the pelletizer 820. In some embodiments, rather than discarding material to the floor, the tacky and/or polymeric material may be directed to a drum for an alternative use or back upstream of the melt pump 812. By optionally discarding the tacky and/or polymeric material before it contacts the pelletizer 820, the polymer diverter valve 815 may prevent an undesired material from damaging the pelletizer 820 or may allow a user to confirm the material's properties before pelletizing it.

Upon receiving the tacky and/or polymeric material passing through the polymer diverter valve 815, the pelletizer 820 may cut the melted tacky and/or polymeric material into pellets and, as the pellets are cut, they may be directed towards the drying section 840. The water box bypass assembly 822 may receive a flow of fluid (e.g., water) that runs from the TWS 830 via a conduit 824, and through the cutting chamber of the pelletizer 820. The fluid may cool the pellets as they are cut and transport them via a conduit 826 to the drying section 840. The TWS 830 may continue to cycle water through the continuous bagging system 800, and the water box bypass assembly 822 allows water to flow around the cutting chamber of the pelletizer 820 such that water may flow in a continuous loop regardless of whether the pelletizer 820 is in operation. Although water is included by way of example, any transport fluid can be used in the continuous bagging system 800, as disclosed herein and in U.S. Patent Pub. No. 2012/0280419 to Martin et al. (for example, at paragraphs [0293]-[0296] and U.S. Pat. No. 8,080,196 to Martin et al. (for example, at Col. 33, ll. 47-65 and Col. 20, ll. 3-51). In some embodiments, the pelletizer 820 may be similar to the pelletizing section 6 as described with respect to FIG. 1.

The pellets may flow into the drying section 840 via a conduit 826. The drying section 840 may include a dryer 842, a pellet exit chute 844, a blower 846, an intake conduit 848, and a pellet diverter valve 850, and may be similar to the drying section 8 as described with respect to FIG. 1. Within the drying section 840, the dryer 842 may defluidize (i.e., separate and/or remove at least a portion of moisture from) or otherwise dry the pellets.

Figure 4:
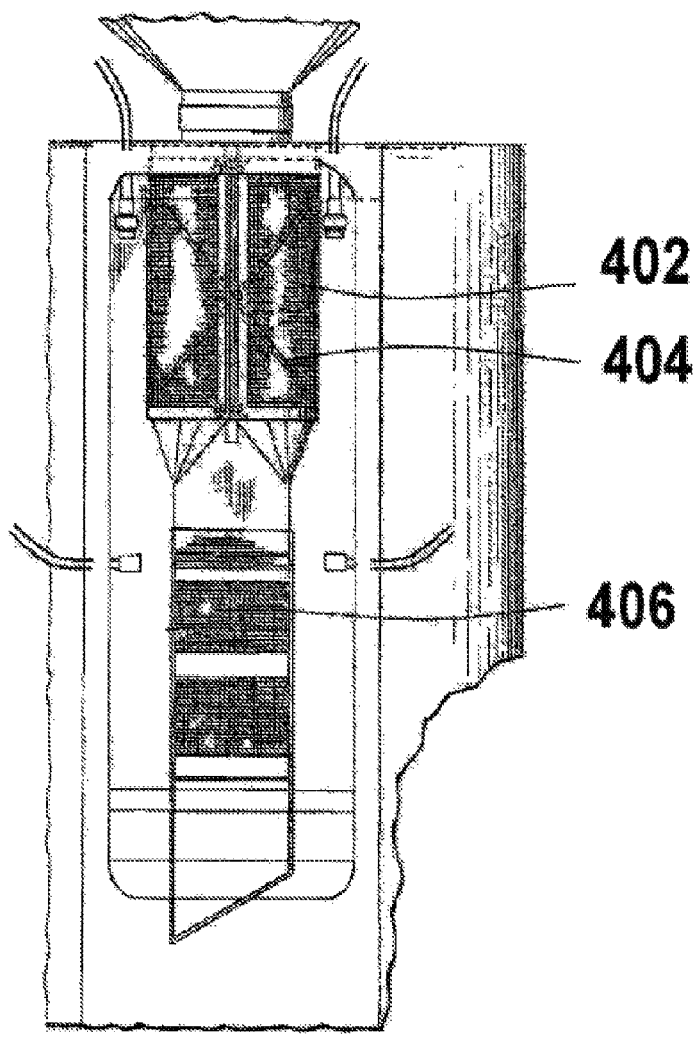
FIG. 4 is a schematic illustration of a vertical dewatering unit for the centrifugal dryer of FIG. 2 in accordance with some embodiments of the present invention.

In some embodiments, the dryer 842 may be a centrifugal dryer and be similar to the dryer 200 as described with respect to FIGS. 2 to 4. The dryer 842 may dry the pellets as they pass through it, and direct the pellets to exit via the pellet exit chute 844 or pellet outlet. The dryer 842 may collect and direct moisture separated from the pellets to the TWS 830 via a conduit 832.

Initially, in some embodiments, the pellets may be directed to a conduit 852 for disposal or inspection by the pellet diverter valve 850. Once the pellets are inspected, the pellet diverter valve 850 may instead direct the pellets towards the multi-port valve 860 and bagging assembly 870.

The multi-port valve 860 may include an inlet 862 and a plurality of outlets 864, and may be similar to the pellet diverting section 10 as described with respect to FIG. 1. In other embodiments, the multi-port valve 860 may be the valve described in U.S. Pat. No. 8,863,931, which is incorporated herein. In further embodiments, the multi-port valve 860 may be a flapper port valve or valves that alternatingly diverts a portion of the pellets to one of the outlets 864. The multi-port valve 860 may receive pellets at the inlet 862 and divert pellets to one or more of the outlets 864.

The bagging assembly 870 may include a plurality of bagging units 872, and may be similar to the bagging device section 12 as described with respect to FIGS. 1 and 6 to 7. Each bagging unit 872 may be associated with one or more outlets 864. In some embodiments, each bagging unit 872 may be positioned under one or more outlets 864 to allow for continuous bagging of the pellets.

FIG. 8*b* shows a detailed schematic view of an embodiment of the drying section 840. The pellets may enter the dryer 842 as described with respect to FIGS. 2 to 4, and be mechanically driven by a rotor disposed within the dryer 842. As shown, the pellets may flow in the direction of a pellet flow 801 from the bottom portion of the dryer 842 towards a pellet outlet at the top portion of the dryer 842 and into a pellet exit chute 844. To help dry the pellets or to prevent excessive moisture from exiting the pellet exit chute 844 with the pellets, one or more blowers 843 may be housed within the dryer 842 and configured to direct a counter flow of air 803 at least partially opposite the pellet flow 801. The blower 843 may draw air in from an air inlet vent 845 located at the top of the dryer 842 and/or from the pellet exit chute 844, and direct air out an air outlet vent 847. In another embodiment, one or more blowers may be positioned outside of the dryer 842 and configured to blow or suction the counter flow of air 803 at least partially against the pellet flow 801. The flow rate of the counter flow of air 803 through the dryer 842 may be limited to a level that does not prevent the pellets from exiting the dryer 842. For example, the rotor may mechanically drive the pellets along a portion of the pellet flow 801 within the dryer 842 and direct the pellets into the pellet exit chute 844. The counter flow of air 803 may be limited such that it does not direct pellets entering the pellet exit chute 844 back into the dryer 842, thereby overcoming the force from the rotor at the pellet exit chute 844. If the counter flow of air 803 is not limited, the pellets may adhere to one another or to surfaces of the dryer, which could clog or jam the continuous bagging system 800.

In other embodiments, however, the counter flow of air 803 may be increased to a flow rate level that would, on its own, prevent the pellets from exiting the dryer 842. For example, in one such embodiment, a blower 846 may direct a transport flow of air 805 to remove pellets from the dryer 842 into the pellet exit chute 844. In doing so, the transport flow of air 805 may help prevent the pellets from sticking together as they exit, or attempt to exit, the dryer 842, while allowing for an increased flow rate of the counter flow of air 803, and thus, increased drying of the pellets and/or preventing excess moisture from escaping the dryer 842. The flow rate of the counter flow of air 803 may still be limited such that it does not overcome the transport flow of air 805 or the rotor. For instance, the counter flow of air 803 may be configured to overcome the force of the rotor only at the pellet exit chute 844 (such that the rotor still mechanically drives the pellets along the rest of the pellet flow path 801), but limited such that the transport flow of air 805 may pull the pellets into the pellet exit chute 844. It is contemplated that the air flows within the dryer 842, along with the mechanical force of the rotor, may be in balance relative to one another and not shift the problem from the pellet exit chute 844 to a conduit 854 or another point downstream.

Additionally, in some embodiments, the blower 846 may direct a drying flow of air 807 in a direction at least partially opposite the pellet flow path for at least a portion of the path from the dryer 842 to the multi-port valve 860 (e.g., the conduit 854) to further dry the pellets. The blower 846 may suction the drying flow of air 807 to further dry the pellets regardless of the flow rate of the counter flow of air 803 through the dryer 842. In some embodiments, the blower 846 may limit suction of the drying flow of air 807 to a level that does not overcome the flow of the pellets down towards the multi-port valve 860. As such, the flow rate of the drying flow of air 807 may depend on a number of factors including, for example, the angle, length, and size of the pellet exit chute 844 and/or the conduit 854, and the pellet size, shape, and tackiness. In some embodiments, the pellet exit chute 844 and/or the conduit 854 may extend downwardly from the dryer 842 at an angle at least 45° from the horizontal plane. The flows of air 803 and 807 opposite the pellet flow 801 may be more effective at removing moisture from the pellets than other methods.

It is contemplated that the blower 846 and intake conduit 848 may be disposed upstream or downstream of the pellet diverter valve 850. Further, the intake conduit 848 may extend from the pellet exit chute 844 or the conduit 854 at any angle and position. In some embodiments, the intake conduit 848 may extend upwardly from the top portion or side(s) of the conduit 854, decreasing the likelihood that pellets would be suctioned into the blower 846 or stuck onto a screen preventing the pellets from being suctioned into the blower 846. While the intake conduit 848 is shown extending vertically from the conduit 854, it is contemplated that the intake conduit 848 may extend from the conduit 854 at any angle (e.g., 30°, 90°, 120°, etc.) to fit the layout of the continuous bagging system 800 and/or to decrease work on the blower 846 by increasing or decreasing the angled corner at which the flows of air 805 and 807 must pass around. In other embodiments, the intake conduit 848 may extend downwardly from the bottom of sides of the conduit 854, and a screen (not shown) may cover the entrance into the intake conduit 848 to prevent pellets from being suctioned into the blower 846. Each of the conduits and chutes transporting the pellets may be substantially straight in some embodiments to prevent the pellets from sticking together or to the conduits.

Figure 9A:
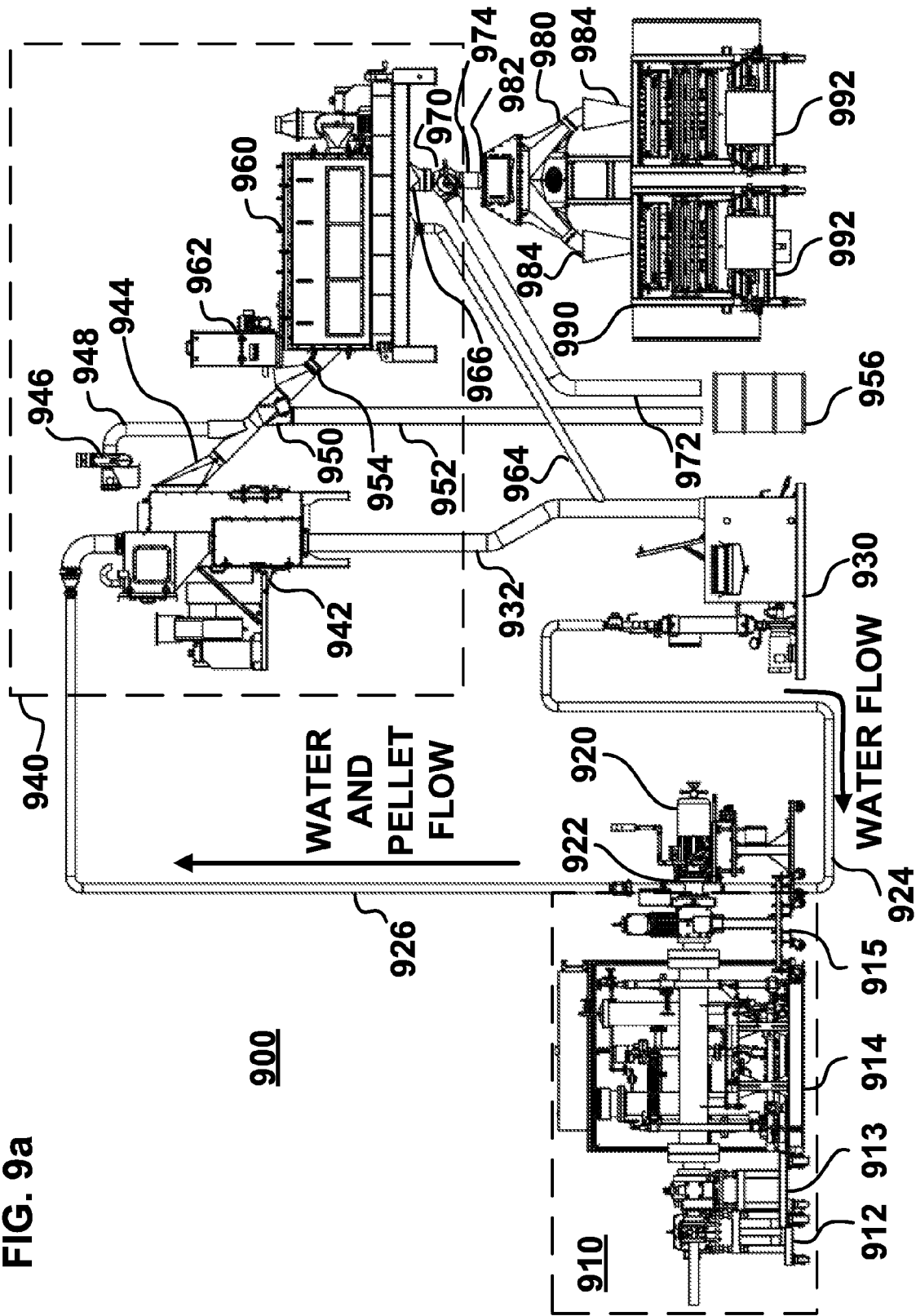
FIG. 9a is a schematic illustration of a continuous bagging system having a blower and a conditioning unit, in accordance with some embodiments of the present invention.

FIG. 9*a* shows an embodiment of a continuous bagging system 900, which may include a melt line 910, a pelletizer 920, a tempered water system ("TWS") 930, a drying section 940, a multi-port valve 980, and a bagging assembly 990. Operation of the continuous bagging system 900 may be similar to that of continuous bagging system 800 with the addition of a conditioning unit 960 disposed within the drying section 940. That is, in some embodiments, the melt line 910 and its material pump 912, melt filter 913, melt tempering unit 914, and polymer diverter valve 915, the pelletizer 920 and its water box bypass assembly 922, conduits 924, 926, and 932, the TWS 930, a dryer 942, a pellet exit chute 944, a blower 946, an intake conduit 948, a pellet diverter valve 950 and its conduit 952 and conduit 954, the multi-port valve 980 and its inlet 982 and plurality of outlets 984, and the bagging assembly 990 and its bagging units 992 may be similar to the corresponding components described with respect to FIGS. 8*a* and 8*b*.

Figure 9B:
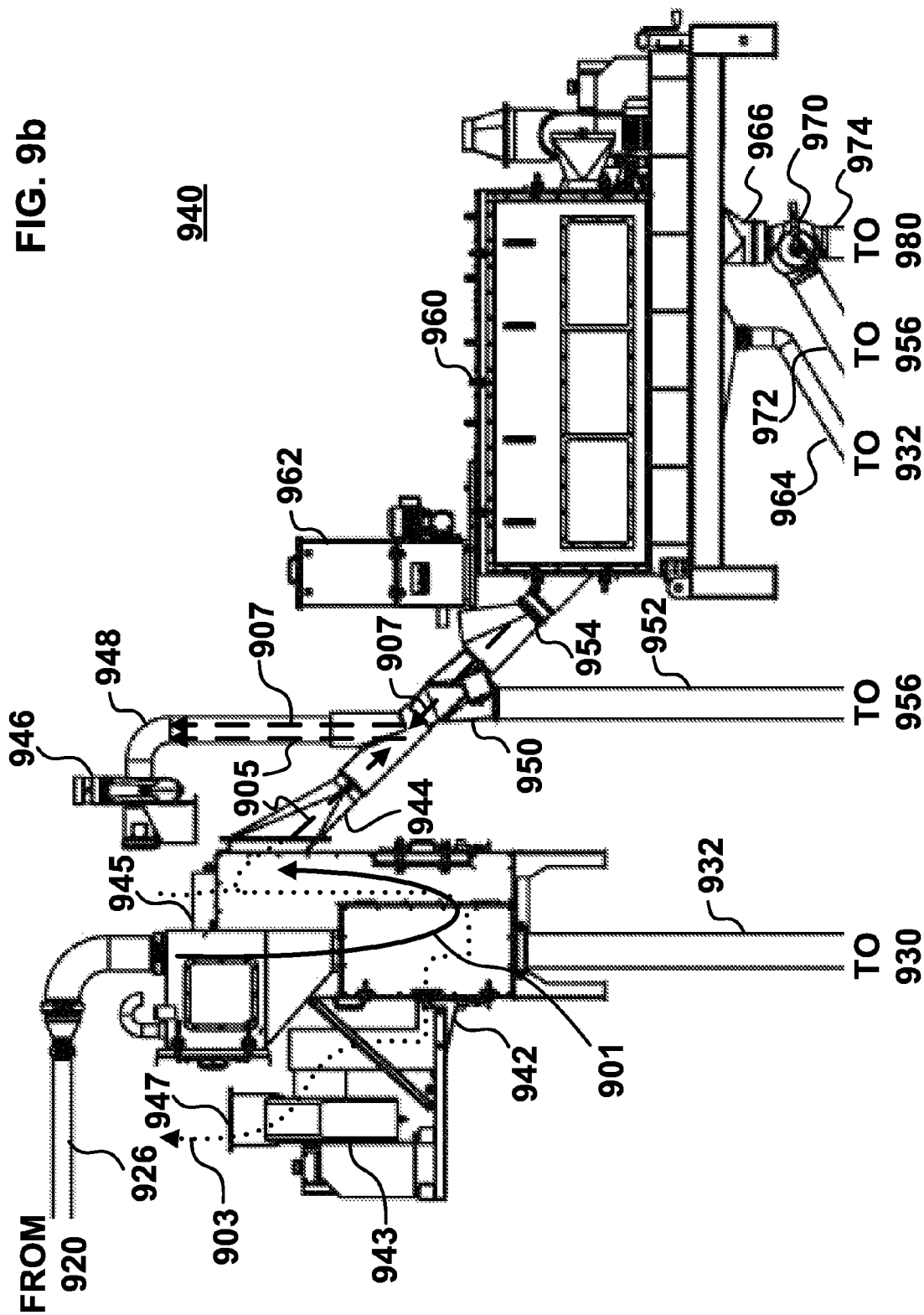
FIG. 9b is a schematic illustration of a drying section of a continuous bagging system having a conditioning unit, in accordance with some embodiments of the present invention.

FIG. 9*b* shows a detailed schematic view of an embodiment of the drying section 940. As shown, the pellets may flow in the direction of a pellet flow 901 from the bottom portion of the dryer 942 towards a pellet outlet at the top portion of the dryer 942 and into the pellet exit chute 944. To further dry the pellets and/or contain moisture within the dryer 942, a blower 943 may be housed within or connected to the dryer 942 and configured to direct a counter flow of air 903 at least partially opposite the pellet flow 901. In some embodiments, the flow rate of the counter flow of air 903 through the dryer 942 may be limited to a level that does not prevent the pellets from exiting the dryer 942 into the pellet exit chute 944. In other embodiments, however, the counter flow of air 903 may be increased to a flow rate level that would, on its own, prevent the pellets from exiting the dryer 942. For example, in one such embodiment, the blower 946 may direct a transport flow of air 905 to remove pellets from the dryer 942 into the pellet exit chute 944. Additionally, the blower 946 may direct a drying flow of air 907 in a direction at least partially opposite the pellet flow path for at least a portion of the path from the dryer 942 to the conditioning unit 960 (e.g., conduit 954) to further dry the pellets. The blower 946 may suction or otherwise direct the drying flow of air 907 to further dry the pellets regardless of the flow rate of the counter flow of air 903 through the dryer 942. The pellet flow 901 (as driven by the rotor of the dryer 942), the counter flow of air 903, and transport flow of air 905, and the drying flow of air 907 may be balanced relative to one another as described with respect to FIG. 8b.

After passing through the dryer 942 and the pellet diverter valve 950, the pellets may pass through conduit 954 to the conditioning unit 960 for conditioning. It is contemplated that the conduit 954 may be configured to prevent the drying flow of air 907 from entering or otherwise affecting the pellet and air flows within the conditioning unit 960. In some embodiments, the conditioning unit 960 may be a coater configured to coat the pellets in a powder from a powder feeder 962. The coating powder may further dry the pellets or make the pellets less likely to adhere to one another or to components of the continuous bagging system 900 prior to bagging, and may be a coating powder as previously described herein.

In other embodiments, the conditioning unit 960 may be a tumbler configured to further dry the pellets by rotating them through a perforated drum. As the pellets move through the conditioning unit 960, moisture may be removed from the pellets and directed to conduit 932 and/or the TWS 930 via a conduit 964. Further, fluid (e.g., water) may be collected at any component within the continuous bagging system 900 and directed back to the TWS 930 for reuse.

It is contemplated that the tumbler may be shaped and/or angled to provide a desired residence time for the pellets or to allow the pellets to sufficiently condition (e.g., warm up). The dried and/or coated pellets may exit the conditioning unit 960 into pellet exit chute 966 and flow into a pellet diverter valve 970. The pellet diverter valve 970, which may be included in any of the disclosed embodiments, may allow for the disposal of unsatisfactory product via a conduit 972. By doing so, the pellet diverter valve 970 allows for the inspection of the product immediately prior to bagging, which could help reduce waste due to clumping or undesirable levels of coating.

Once the product is deemed satisfactory, the pellets exiting the pellet exit chute 966 may be transported via a conduit 974 to the multi-port valve 980, which diverts the pellets as desired to the outlets 984 for continuous bagging via the bagging assembly 990.

Figure 10:
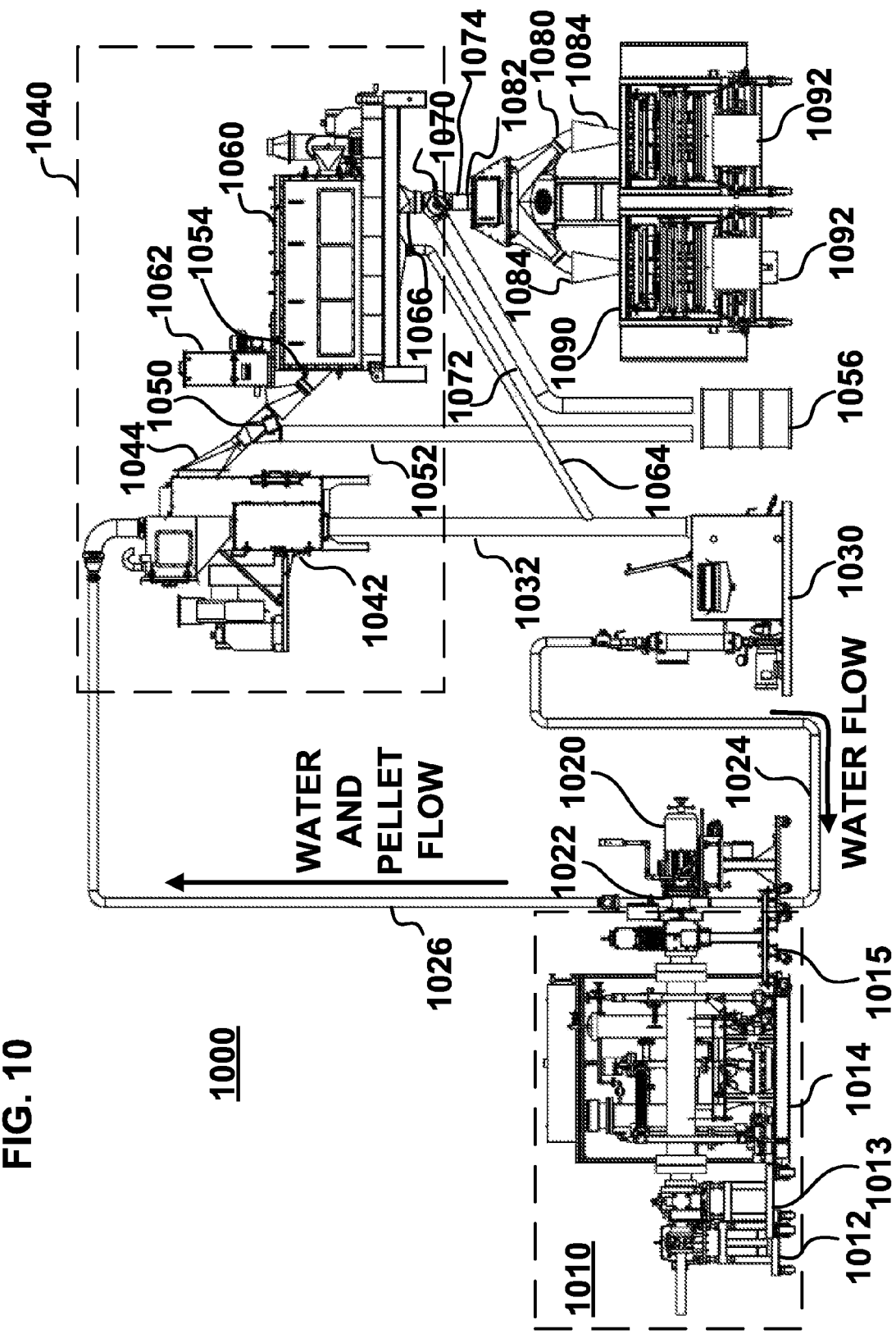
FIG. 10 is a schematic illustration of a continuous bagging system having a tumbler configured to coat and/or dry the pellets, in accordance with some embodiments of the present invention.

FIG. 10 shows an embodiment of a continuous bagging system 1000, which may include melt line 1010, a pelletizer 1020, a tempered water system ("TWS") 1030, a drying section 1040, pellet diverter valves 1050 and 1070, a multi-port valve 1080, and a bagging assembly 1090. Operation of the continuous bagging system 1000 may be similar to that of continuous bagging system 900 without the blower 946 and the intake conduit 948 within the drying section 940. That is, in some embodiments, the melt line 1010 and its material pump 1012, melt filter 1013, melt tempering unit 1014, and polymer diverter valve 1015, the pelletizer 1020 and its water box bypass assembly 1022, conduits 1024, 1026, and 1032, the TWS 1030, a dryer 1042, a pellet exit chute 1044, pellet diverter valves 1050 and 1070 and their conduits 1052 and 1072, a conduit 1054, the conditioning unit 1060 and its powder feeder 1062 and conduits 1064 and 1066, a conduit 1074, the multi-port valve 1080 and its inlet 1082 and plurality of outlets 1084, and the bagging assembly 1090 and its bagging units 1092 may be similar to the corresponding components described with respect to FIGS. 9a and 9b.

In operation, the continuous bagging system 1000 may defluidize or otherwise dry pellets in the dryer 1042, and direct the pellets out of the pellet exit chute 1044 and into the conditioning unit 1060 for conditioning. In some embodiments, the conditioning unit 1060 may be a coater configured to coat the pellets in a powder from the powder feeder 1062. The coating powder may further dry the pellets or make the pellets less likely to adhere to one another or to components of the continuous bagging system 1000 prior to bagging. In other embodiments, the conditioning unit 1060 may be a tumbler configured to further dry and/or classify the pellets by rotating them through a perforated drum, as previously described with respect to FIG. 9b. As the pellets move through the conditioning unit 1060, moisture may be removed from the pellets and directed to conduit 1032 and/or the TWS 1030 via a conduit 1064. The dried and/or coated pellets may exit the conditioning unit 1060 into pellet exit chute 1066 and flow into the pellet diverter valve 1070. The pellet diverter valve 1070 may allow for the disposal of unsatisfactory product via the conduit 1072. By doing so, the pellet diverter valve 1070 allows for the inspection of the product immediately prior to bagging, which could help reduce waste due to clumping or undesirable levels of coating.

Figure 11:
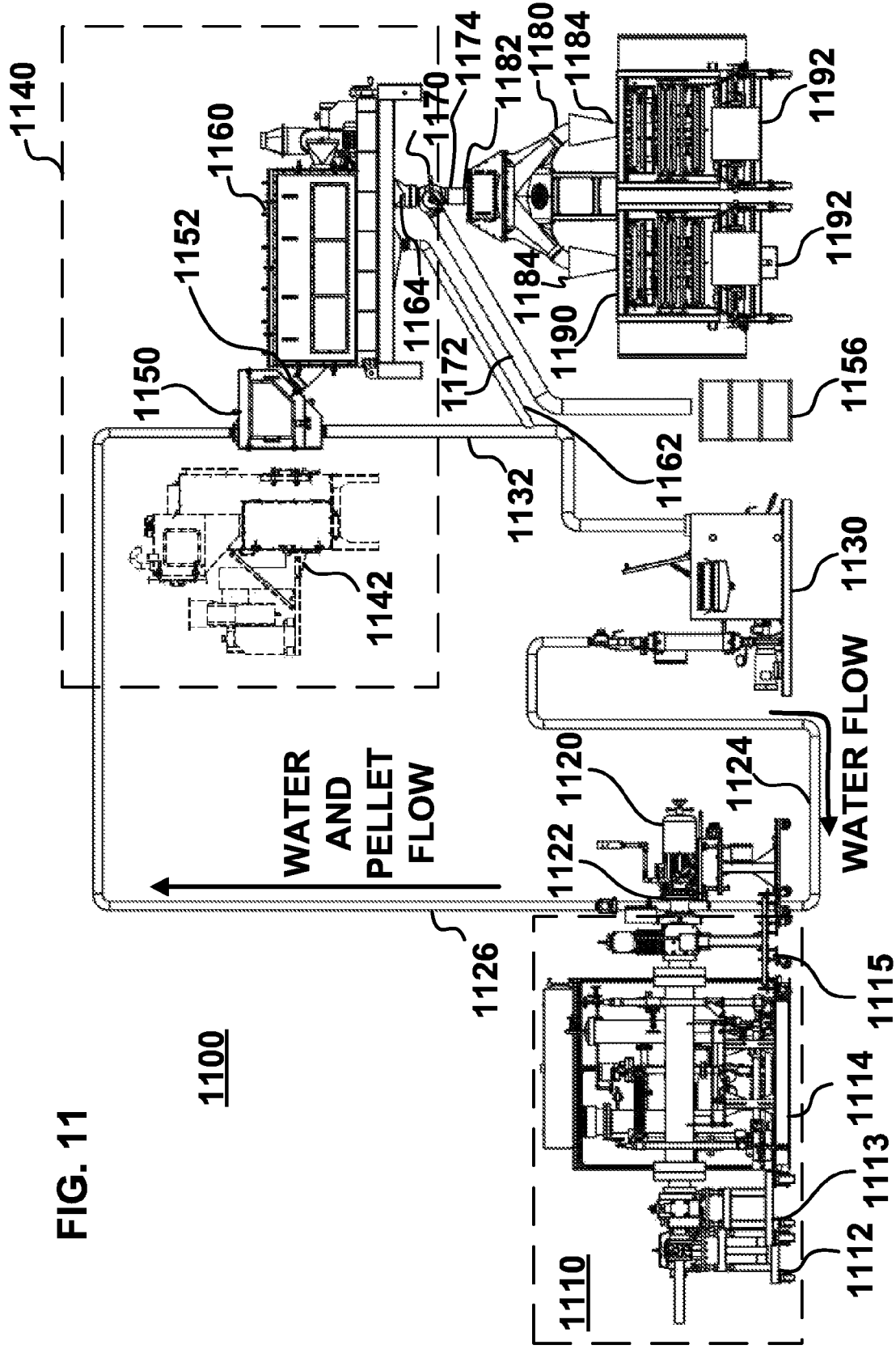
FIG. 11 is a schematic illustration of a continuous bagging system having a secondary dryer, in accordance with some embodiments of the present invention.

FIG. 11 shows an embodiment of a continuous bagging system 1100, which may include melt line 1110, a pelletizer 1120, a tempered water system ("TWS") 1130, a drying section 1140, a pellet diverter valve 1170, a multi-port valve 1180, and a bagging assembly 1190. Operation of the continuous bagging system 1100 may be similar to that of continuous bagging system 1000 wherein the dryer 1042 is replaced with a dewatering unit 1150. That is, in some embodiments, the melt line 1110 and its material pump 1112, melt filter 1113, melt tempering unit 1114, and polymer diverter valve 1115, the pelletizer 1120 and its water box bypass assembly 1122, conduits 1124, 1126, and 1132, the TWS 1130, the conditioning unit 1160 and its conduits 1162 and 1164, a pellet diverter valve 1170 and its conduits 1172 and 1174, the multi-port valve 1180 and its inlet 1182 and plurality of outlets 1184, and the bagging assembly 1190 and its bagging units 1192 may be similar to the corresponding components described with respect to FIG. 10.

In operation, the continuous bagging system 1100 may dry pellets in the dewatering unit 1142, direct the pellets out of the pellet slurry outlet 1152 and into the conditioning unit 1160 for conditioning (e.g., final dewatering). In some embodiments, the dewatering unit 1150, acting as a water separator/dewaterer in the continuous bagging system 1100, may remove between about 70% to about 75% of the fluid (e.g., water plus additives) from the pellets. The dewatering unit 1150 may be uniquely suited to defluidize or otherwise dry extremely brittle material that may not survive a centrifugal dryer. In some embodiments, the dewatering unit 1150 may be stationary and house a screen at about 45° to horizontal to allow fluid to pass through downwardly while directing the pellets to one side. Thus, the fluid can flow through the angled screen as the angled screen directs the pellets away from the fluid and to an exit area of the dewatering unit 1150. It is contemplated that the screen may be disposed at any angle. Used in this manner, the screen may be a perforated mesh screen. In one embodiment, for example, the screen may be about six inches in diameter and two feet long.

In some embodiments, the dewatering unit 1150 may house one or more dynamic screens, such as a rotating or vibrating screen. The pellets rest on the vibrating screen(s), and the vibration of the screen(s) can cause excess fluid to drain off the pellets and fall through the screen(s). In some embodiments, the screens can be layered to allow smaller pellets to fall through the upper screen(s), which can have larger gaps, onto lower screen(s), which can have smaller gaps. In this manner, the screens can separate the pellets by size while drying the pellets. The vibration can also cause the pellets to move along the screens, while drying, to an exit area of the dewatering unit 1150.

In other embodiments, the dewatering unit 1150 may comprise a fines removal sieve to remove fines, or excess material, from the fluid/pellet flow. Moreover, in some embodiments, the dewatering unit 1150 may comprise forced or heated air convection systems, rotating drying systems, or a fluidized bed. In some embodiments, the dewatering unit 1150 may comprise an agglomerate catcher to remove agglomerates from the pellet flow. Alternatively, the agglomerate catcher can be separate from the dewatering unit 1150.

Positioned for quick attachment and integration into the continuous bagging system 1100, a dryer 1142 similar to the dryer 1042 described with respect to FIG. 10 may be included in the continuous bagging system 1100 in some embodiments. Regardless of whether the dewatering unit 1150 or the dryer 1142 is used to defluidize or otherwise dry the pellets, the conditioning unit 1160 may be a tumbler and act as a secondary dryer for the pellets. In some embodiments, the conditioning unit 1160 may rotate the pellets in a perforated drum, thereby removing between about 20% to about 30% of the fluid (e.g., water plus additives) from the pellets. In other embodiments, the conditioning unit 1160 may be a tumbler and act as a classifier and only allow pellets of a certain size and/or shape to pass or otherwise sort the pellets.

Although not shown in FIG. 11, one or more additional conditioning units may be included downstream of the conditioning unit 1160. For example, a downstream conditioning unit may be a coater configured to coat the pellets in a powder from a powder feeder. The coating powder may further dry the pellets or make the pellets less likely to adhere to one another or to components of the continuous bagging system 1100 prior to bagging. It is contemplated that multiple conditioning units 1160 may be used to defluidize or otherwise dry and coat the pellets. Additionally, one or more blowers and/or pellet diverter valves may be used with any of the disclosed continuous bagging systems 800, 900, 1000, and 1100.

As the pellets move through the conditioning unit 1160, moisture may be removed from the pellets and directed to conduit 1132 and/or the TWS 1130 via a conduit 1162. The dried and/or coated pellets may exit the conditioning unit 1160 into pellet exit chute 1164 and flow into the pellet diverter valve 1170. The pellet diverter valve 1170 may allow for the disposal of unsatisfactory product via the conduit 1172. By doing so, the pellet diverter valve 1170 allows for the inspection of the product immediately prior to bagging, which could help reduce waste due to clumping or undesirable levels of coating.

While the present disclosure has been described in connection with a plurality of exemplary aspects, as illustrated in the various figures and discussed above, it is understood that other similar aspects can be used or modifications and additions can be made to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

What is claimed:

1. A method for continuously bagging tacky and/or polymer-containing pellets, the method comprising:
   pelletizing a tacky and/or polymer-containing composition in a pelletizer;
   defluidizing pellets of the tacky and/or polymer-containing composition in a dryer;
   directing the defluidized pellets from a pellet outlet of the dryer towards a multi-port valve, wherein directing the pellets towards the multi-port valve comprises i) providing a drying flow of air at least partially opposite a directional flow of the pellets towards the multi-port valve, and ii) providing a transport flow of air to pull the defluidized pellets away from the pellet outlet;
   continuously diverting a specific quantity of the pellets through one of a plurality of outlets of the multi-port valve; and
   continuously bagging the pellets using a bagging assembly located at one or more of the plurality of outlets of the multi-port valve.

2. The method for continuously bagging tacky and/or polymer-containing pellets in claim 1, wherein providing the drying flow of air comprises suctioning, by one or more blowers disposed between the pellet outlet and the multi-port valve, the drying flow of air, and providing the transport flow of air comprises suctioning, by the one or more blowers, the transport flow of air.

3. The method for continuously bagging tacky and/or polymer-containing pellets in claim 1, wherein defluidizing the pellets comprises directing the pellets through the dryer along a pellet flow path, and providing, along at least a portion of the pellet flow path, a counter flow of air at least partially opposite the pellet flow path.

4. The method for continuously bagging tacky and/or polymer-containing pellets in claim 3, wherein directing the defluidized pellets towards the multi-port valve comprises:
   suctioning, by one or more blowers disposed between the pellet outlet and the multi-port valve, a transport flow of air at a flow rate sufficient to overcome the counter flow of air at the pellet outlet and pull the defluidized pellets away from the pellet outlet; and
   suctioning, by the one or more blowers, the drying flow of air to dry the defluidized pellets.

5. The method for continuously bagging tacky and/or polymer-containing pellets in claim 3, wherein directing the pellets through the dryer comprises mechanically driving the pellets through the dryer along at least a portion of the pellet flow path to overcome the counter flow of air.

6. The method for continuously bagging tacky and/or polymer-containing pellets in claim 5, wherein mechanically driving the pellets comprises mechanically driving the pellets through the dryer along the pellet flow path via a rotor.

7. The method for continuously bagging tacky and/or polymer-containing pellets in claim 5, wherein:
providing the counter flow of air comprises providing, at least at the pellet outlet, the counter flow of air at a flow rate sufficient to overcome the mechanical driving of the pellets to prevent the pellets from exiting the pellet outlet, and
directing the defluidized pellets towards the multi-port valve comprises suctioning a transport flow of air at a flow rate sufficient to overcome the counter flow of air at the pellet outlet to pull the de-fluidized pellets away from the pellet outlet.

8. The method for continuously bagging tacky and/or polymer-containing pellets in claim 1, wherein continuously diverting the specific quantity of pellets through one or more of the plurality of outlets of the multi-port valve is based on a predetermined time interval that results in diverting the specific quantity of pellets.

9. The method for continuously bagging tacky and/or polymer-containing pellets in claim 1, further comprising:
conditioning the defluidized pellets in a conditioning unit downstream of the dryer, wherein conditioning the defluidized pellets comprises one or more of drying the defluidized pellets and applying a powder coating to the defluidized pellets; and
directing the pellets from the conditioning unit to the multi-port valve.

10. The method for continuously bagging tacky and/or polymer-containing pellets in claim 9, wherein the conditioning unit is a tumbler.

11. A system for continuously bagging tacky and/or polymer-containing pellets, the system comprising:
a pelletizer configured to pelletize a tacky and/or polymer-containing composition;
a dryer configured to dry pellets of the tacky and/or polymer-containing composition as the pellets move along a pellet flow path through the dryer and out through a pellet outlet, wherein at least a portion of the dryer is configured to receive a counter flow of air at least partially opposite the pellet flow path;
a conduit configured to receive the dried pellets from the dryer, the conduit comprising one or more blowers configured to provide a transport flow of air to pull the dried pellets away from the pellet outlet and to the conduit;
a multi-port valve configured to continuously route an incoming flow of the pellets, the multi-port valve having at least one inlet for receiving the incoming flow of pellets and a plurality of outlets for dispensing an outgoing flow of the pellets; and
a plurality of bagging assemblies configured to alternatingly receive a predetermined quantity of pellets from one or more outlets of the plurality of outlets of the multi-port valve to allow continuous bagging of the pellets.

12. The system for continuously bagging tacky and/or polymer-containing pellets of claim 11, wherein the one or more blowers are further configured to suction a drying flow of air at least partially opposite a directional flow of the pellets towards the multi-port valve.

13. The system for continuously bagging tacky and/or polymer-containing pellets of claim 11, further comprising a conditioning unit configured to further dry and/or apply a coating powder to the dried pellets.

14. The system for continuously bagging tacky and/or polymer-containing pellets of claim 13, wherein the conditioning unit is a tumbler.

15. The method for continuously bagging tacky and/or polymer-containing pellets in claim 9, wherein de-fluidizing the pellets in one or more of the dryer and the dewatering unit comprises removing about 70 percent to about 75 percent of fluid from the pellets, and conditioning the pellets comprises removing about 20 percent to about 30 percent of the fluid from the pellets.

* * * * *